(12) United States Patent
Sugano et al.

(10) Patent No.: US 9,129,165 B2
(45) Date of Patent: Sep. 8, 2015

(54) RFID TAG READER, RFID TAG READING SYSTEM, METHOD FOR PERFORMING RFID TAG READING PROCESS AND COMPUTER-READABLE RECORDING MEDIUM

(71) Applicant: FUJITSU LIMITED, Kawasaki-shi (JP)

(72) Inventors: Hiroyasu Sugano, Kawasaki (JP); Shinichi Shiotsu, Kawasaki (JP); Hideki Tanaka, Kawasaki (JP); Koichi Yokota, Kawasaki (JP); Akira Itasaki, Kawasaki (JP); Daisuke Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 279 days.

(21) Appl. No.: 13/714,603

(22) Filed: Dec. 14, 2012

(65) Prior Publication Data
US 2013/0169417 A1   Jul. 4, 2013

(30) Foreign Application Priority Data
Dec. 28, 2011 (JP) ................................ 2011-289874

(51) Int. Cl.
H04Q 5/22   (2006.01)
G06K 7/01   (2006.01)
G06K 7/10   (2006.01)

(52) U.S. Cl.
CPC .............. G06K 7/01 (2013.01); G06K 7/10108 (2013.01)

(58) Field of Classification Search
USPC .................. 340/10.1–10.6, 572.1–572.9; 235/375–385
See application file for complete search history.

(56) References Cited

U.S. PATENT DOCUMENTS

| | | | |
|---|---|---|---|
| 2005/0270407 A1* | 12/2005 | Yamaguchi | 348/345 |
| 2005/0280538 A1* | 12/2005 | Kawai et al. | 340/572.1 |
| 2007/0229230 A1* | 10/2007 | Drago et al. | 340/10.52 |
| 2009/0005064 A1* | 1/2009 | Malik et al. | 455/456.1 |
| 2010/0021257 A1* | 1/2010 | Hall et al. | 410/46 |
| 2010/0164723 A1* | 7/2010 | Shiau et al. | 340/572.1 |
| 2010/0214071 A1* | 8/2010 | Nagai et al. | 340/10.1 |

FOREIGN PATENT DOCUMENTS

| | | | |
|---|---|---|---|
| JP | 2008017947 A | * | 1/2008 |
| JP | 2008165576 A | * | 7/2008 |
| JP | 2008250676 A | * | 10/2008 |
| JP | 2008309607 A | * | 12/2008 |
| JP | 2009065296 A | * | 3/2009 |
| JP | 2009065591 A | * | 3/2009 |
| JP | 2009-276939 | | 11/2009 |
| JP | 2009276939 A | * | 11/2009 |
| JP | 2013097408 A | * | 5/2013 |
| WO | WO 2011114474 A1 | * | 9/2011 |
| WO | WO 2013008886 A1 | * | 1/2013 |

* cited by examiner

Primary Examiner — Paul Obiniyi
(74) Attorney, Agent, or Firm — Fujitsu Patent Center

(57) ABSTRACT

An RFID tag reader is disclosed that includes a signal intensity obtaining part configured to obtain signal intensities of a first RFID tag and a second RFID tag that are read at plural read processes, a read-number obtaining part configured to obtain a number of RFID tags, among the first and the second RFID tags, that are read at the same read process, a processing part configured to weight the signal intensity of the first RFID tag obtained by the signal intensity obtaining part based on the number obtained at the corresponding read process, and a selecting part configured to select a read result of the first RFID tag based on the signal intensity of the first RFID tag weighted by the processing part.

8 Claims, 16 Drawing Sheets

FIG.5

| r (dBm) | INTEGER VALUE |
|---|---|
| r < -57.5 | 1 |
| -57.5 ≦ r < -56.5 | 2 |
| ≀ | |
| -49.5 ≦ r < -48.5 | 10 |
| -48.5 ≦ r < -47.5 | 11 |
| ≀ | |
| -38.5 ≦ r < -37.5 | 21 |
| -37.5 ≦ r < -36.5 | 22 |
| ≀ | |
| -28.5 ≦ r < -27.5 | 31 |
| -27.5 ≦ r | 32 |

| Ith READ PROCESS | T1 | T2 | T3 | T4 | T5 | T6 | T7 | T8 | T9 | T10 | T11 | T12 |
|---|---|---|---|---|---|---|---|---|---|---|---|---|
| ID1 |  |  | 1 | 4 |  | 7 | 9 | 23 |  |  |  |  |
| ID2 |  |  |  | 3 | 8 | 4 |  | 19 | 11 |  |  |  |
| ID3 |  |  |  |  | 6 |  | 8 | 21 | 12 |  |  |  |
| ID4 |  |  |  |  |  | 10 | 4 | 20 | 16 |  |  |  |
| ID5 |  |  |  |  |  | 4 |  | 23 | 13 |  |  |  |
| ID6 |  |  |  |  |  |  |  | 18 |  |  |  |  |
| ID7 |  |  |  |  |  |  |  | 8 |  | 13 |  | 9 |
| ID8 |  |  |  |  |  |  | 14 | 22 | 14 |  |  |  |

(B)

| ANTENNA ID | 1 | 2 | 1 | 2 | 1 | 2 | 1 | 2 | 1 | 2 | 1 | 2 |
|---|---|---|---|---|---|---|---|---|---|---|---|---|

(C)

| SIMULTANEOUS- READ-NUMBER | 0 | 0 | 0 | 2 | 2 | 4 | 3 | 8 | 5 | 1 | 0 | 1 |
|---|---|---|---|---|---|---|---|---|---|---|---|---|

FIG.8

| | Mn | s_x | $\sum_{j=1}^{m} a\_j \times r\_j \times (n\_j/Mn)$ (NUMERATOR OF FORMULA (1)) | Rx | RA_x |
|---|---|---|---|---|---|
| ID1 | 8 | 4 | 34.75 | 8.6875 | 10.75 |
| ID2 | 8 | 4 | 33.675 | 8.40625 | 9.25 |
| ID7 | 8 | 3 | 6.75 | 2.25 | 10.0 |

FIG.11

(A) OBTAINED PATTERN : y = y1, y2, y3 ··· yN−2, yN−1, yN

REFERENCE OBTAINED PATTERN : z = z1, z2, z3 ··· zM−2, zM−1, zM (B)

| ANTENNA ID | 1 | 2 | 3 | 4 | 1 | 2 | 3 | 4 | ... | 1 | 2 | 3 | 4 |
|---|---|---|---|---|---|---|---|---|---|---|---|---|---|
| OBTAINED PATTERN | | | y1 | y2 | y3 | ... | ... | ... | ... | yN−2 | yN−1 | yN | |

(C)

| ANTENNA ID | 1 | 2 | 3 | 4 | ... | 1 | 2 | 3 | 4 |
|---|---|---|---|---|---|---|---|---|---|
| REFERENCE OBTAINED PATTERN | z1 | z2 | z3 | | ... | zM−2 | zM−1 | zM | |

FIG.13

(A) $z = z1, z2, z3 \cdots zM-2, zM-1, zM$

→

$z\_k = zN-2, zN-1, zN \cdots zM+N-5, zM+N-4, zM+N-3$ (B)

| 1 | 2 | 3 | 4 | 1 | ... | ... | 1 | 2 | 3 | 4 |
|---|---|---|---|---|---|---|---|---|---|---|
|   | y1 | y2 | y3 |   | ... | ... | yN-2 | yN-1 | yN |   |

↔

| 1 | 2 | 3 | 4 |
|---|---|---|---|
| zN-2 | zN-1 | zN |   |

| ... | 1 | 2 | 3 | 4 |
|---|---|---|---|---|
| ... | ... | zM+N-5 | zM+N-4 | zM+N-3 |

| 1 | 2 | 3 | 4 | ... | 1 | 2 | 3 | 4 |
|---|---|---|---|-----|---|---|---|---|
| zk | zk+1 | zk+2 | ... | ... | y1 | y2 | y3 | |

↕

| 1 | 2 | 3 | 4 | ... | 1 | 2 | 3 | 4 |
|---|---|---|---|-----|---|---|---|---|
| ... | z0 | z1 | z2 | z3 | yN−2 | yN−1 | yN | |

| Ith READ PROCESS | T1 | T2 | T3 | T4 | T5 | T6 | T7 | T8 | T9 | T10 | T12 | |
|---|---|---|---|---|---|---|---|---|---|---|---|---|
| ID1 |  |  |  | 4 |  | 7 | 9 | 23 |  |  |  |  |
| ID2 |  |  | 3 | 3 | 8 | 4 |  | 19 | 11 |  |  |  |
| ID3 |  |  |  |  | 8 |  |  | 21 | 12 |  |  |  |
| ID4 |  |  |  |  | 6 | 10 | 8 | 20 | 16 |  |  |  |
| ID5 |  |  |  |  |  | 4 | 4 | 23 | 13 |  |  |  |
| ID6 |  |  |  |  |  |  |  | 18 |  |  |  |  |
| ID7 |  |  |  |  |  |  |  | 8 |  | 13 |  | 9 |
| ID8 |  |  |  |  |  |  |  | 22 | 14 |  |  |  |

(B)

| ANTENNA ID | 1 | 2 | 3 | 4 | 1 | 2 | 3 | 4 | 1 | 2 | 3 | 4 |
|---|---|---|---|---|---|---|---|---|---|---|---|---|

(C)

| SIMULTANEOUS-READ-NUMBER | 0 | 0 | 0 | 2 | 2 | 4 | 3 | 8 | 5 | 1 | 0 | 1 |
|---|---|---|---|---|---|---|---|---|---|---|---|---|

FIG.16

| IDx | Mn | L(y) | L(z) | MAXIMUM VALUE OF NUMERATOR OF FORMULA (3) | $\sqrt{L(y) \times L(z)}$ | S(y) |
|---|---|---|---|---|---|---|
| ID1 | 8 | 675 | 609 | 498 | 641.15 | 0.777 |
| ID2 | 8 | 507 | 609 | 476.5 | 555.66 | 0.858 |
| ID7 | 8 | 314 | 609 | 160 | 437.29 | 0.366 |

RFID TAG READER, RFID TAG READING SYSTEM, METHOD FOR PERFORMING RFID TAG READING PROCESS AND COMPUTER-READABLE RECORDING MEDIUM

CROSS-REFERENCE TO RELATED APPLICATIONS

This application is based upon and claims the benefit of priority of the prior Japanese Patent Application No. 2011-289874 filed on Dec. 28, 2011, the entire contents of which are incorporated herein by reference.

FIELD

The present disclosures relate to an RFID tag reader, an RFID tag reading system, a method for performing RFID tag reading process and computer-readable recording medium.

BACKGROUND

Conventionally, there has been a radio-frequency identification (RFID) tag system which obtains ID information from a RFID tag that passes through plural gates disposed close to each other. The RFID tag system includes a RFID reader which has transmission means, obtaining means and measurement means. The RFID reader has one or plural of antennas that are provided at the gate. The transmission means transmit a read command to the RFID tag when the RFID tag enters the gate. The RFID tag outputs a response signal when the RFID tag receives the read signal. The obtaining means receive the response signal from the RFID tag and obtain the ID information of the RFID tag. The measurement means measure power of the response signal.

However, there is a problem in that the RFID tag system may receive the ID information from the RFID tag which does not pass through the gate when the reader receives the ID information of other RFID tags passing through the gate. Such a problem may occur in a case where the RFID tag is provided close to the gate, for example. In this case, the RFID tag which is provided close to the gate and does not pass through the gate is an unwanted tag. In order to solve the problem, there is a RFID tag system which includes a determining part that determines whether a detected RFID tag is an unwanted tag based on a time series change of power received from the detected RFID tag, and a filtering part that filters out the ID information of the unwanted tag.

The conventional RFID tag system has a threshold value of signal intensity, and recognizes the detected tag as an intended tag which is to be read in a case where the signal intensity obtained from the detected tag when the detected tag passes through the gate exceeds the threshold value and where a time series change of the signal intensity includes only one peak.

However, many kinds of patterns of the time series changes of the signal intensity may be obtained when the detected tag passes through the gate in actual operation, and it is not always true that only one peak is obtained in the time series changes of the signal intensity. Accordingly, in the conventional RFID tag system, it is difficult to determine whether the detected tag is the intended tag or the unwanted tag.

In a case where the conventional RFID tag system is installed at a gate through which an article with the tag attached passes, the unwanted tag is not a type of tag which passes through the gate and is read by the system at the gate, but is a type of tag which does not pass through the gate but is read by the system near the gate.

In a case where it is difficult to determine whether the detected tag is the intended tag or the unwanted tag, reading accuracy of the system will be degraded.

PRIOR ART REFERENCES

Patent References

Patent Document 1: Japanese Laid-open Patent Publication No. 2009-276939

SUMMARY

According to an aspect of an embodiment, there is provided an RFID tag reader including a signal intensity obtaining part configured to obtain signal intensities of a first RFID tag and a second RFID tag that are read at plural read processes, a read-number obtaining part configured to obtain a number of RFID tags, among the first and the second RFID tags, that are read at the same read process, a processing part configured to weight the signal intensity of the first RFID tag obtained by the signal intensity obtaining part based on the number obtained at the corresponding read process, and a selecting part configured to select read result of the first RFID tag based on the weighted signal intensity of the first RFID tag weighted by the processing part.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF THE DRAWINGS

FIG. 5 is a diagram illustrating a relationship between signal intensities and integer values that are used in the RFID tag reading system according to the first embodiment;

FIG. 6 is a diagram illustrating an example of a relationship of the signal intensities read by the RFID tag reading system in chronological order, IDs of RFID tags, antenna IDs, and a simultaneous-read-number.

FIG. 8 is a diagram illustrating weighted mean signal intensities $R\_xs$ of the RFID tags obtained by the RFID tag reading system;

FIG. 11 is a diagram illustrating examples of an obtained pattern, a reference obtained pattern, a relationship between the antenna ID and an obtained pattern, and a relationship between the antenna ID and a reference obtained pattern;

FIG. 13 is a diagram illustrating processes of calculating a similarity while changing values of an index I;

FIG. 14 is a diagram illustrating processes of calculating a similarity while changing values of an index I;

FIG. 15 is a diagram illustrating an example of a relationship of the signal intensities read by the RFID tag reading system in chronological order, the IDs of the RFID tags, the antenna IDs, simultaneous-read-numbers; and FIG. 16 is a diagram illustrating a result of a calculation of the similarities in the RFID tag reading system according to the second embodiment.

DESCRIPTION OF EMBODIMENTS

A description is given, with reference to the accompanying drawings, of embodiments of an RFID tag reader, an RFID tag reading system, a method for performing RFID tag reading process and computer-readable recording medium.

A description is given, with reference to the accompanying drawings, of embodiments of an RFID tag reader, an RFID tag reading system, a method for reading an RFID tag and a computer-readable, non-transitory medium storing a program which, when executed by a computer, causes the computer to perform a reading process of an RFID tag.

First Embodiment

Figure 1:
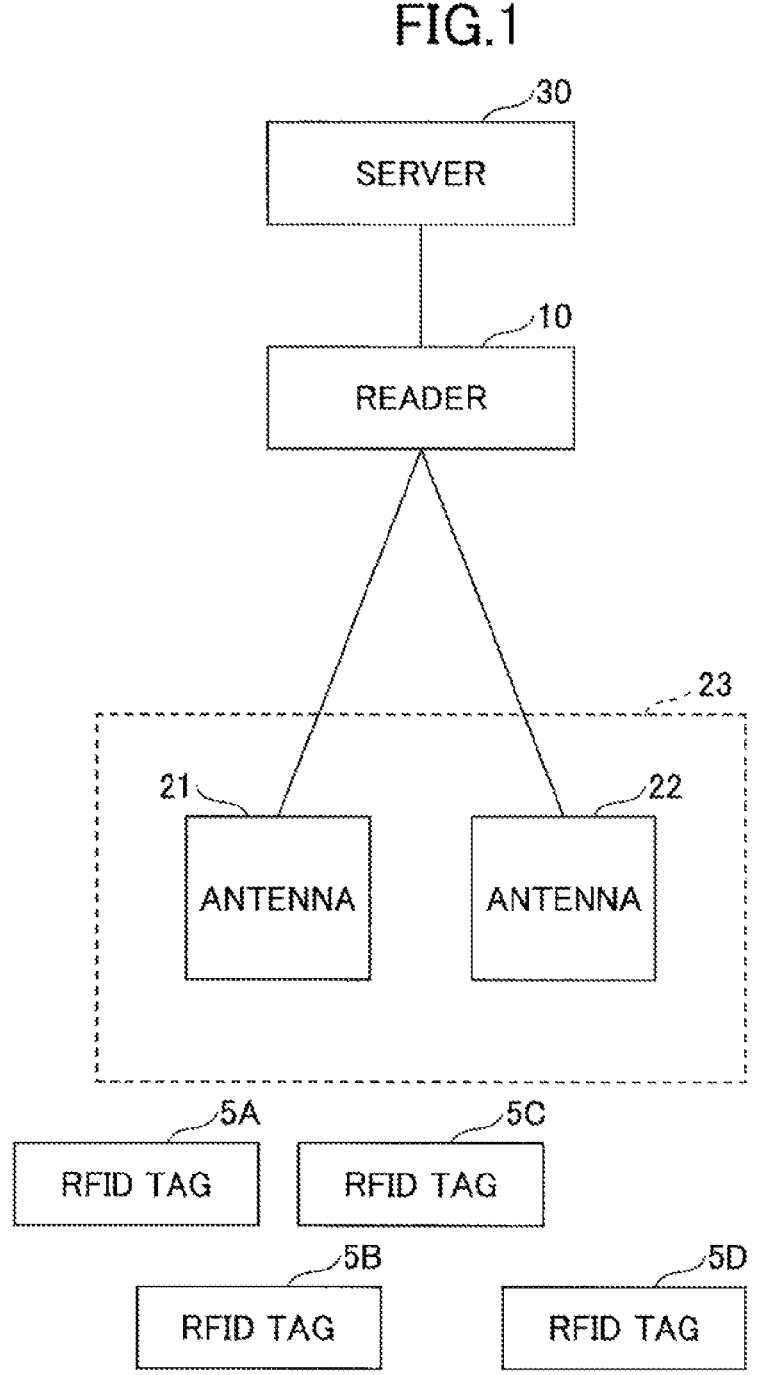
FIG. 1 is a diagram illustrating a configuration of an RFID tag reading system according to a first embodiment.

FIG. 1 is a diagram illustrating a configuration of an RFID tag reading system according to the first embodiment.

The RFID tag reading system 1 includes an RFID tag reader 10, antennas 21 and 22, and a server 30.

The RFID tag reader 10 is a type of reading apparatus which reads RFID tags 5A, 5B, 5C and 5D. The antennas 21 and 22 are connected to the RFID tag reader 10. The RFID tag reader 10 is connected to the server 30 via a wired local area network (LAN), a wireless LAN, a wide area network (WAN) or the like.

Although the antennas 21 and 22 are connected to the RFID tag reader 10 as illustrated in FIG. 1, at least one antenna may be connected to the RFID tag reader 10. Any number of antennas may be connected to the RFID tag reader 10. Although the four RFID tags 5A~5D are illustrated in FIG. 1, number of the RFID tag is not limited to four. Any number of the RFID tag(s) may be used in the RFID tag reading system 1. Plural of the RFID tag readers 10 may be connected to the single server 30.

The RFID tag reader 10 performs wireless bidirectional data communication with the RFID tags 5A~5D via the antennas 21 and 22. The RFID tag reader 10 transmits read commands or the like to the RFID tags 5A~5D. The RFID tags 5A~5D transmit response signals to the RFID tag reader 10.

The data communication of the command and the response signals between the RFID tag reader 10 and the RFID tags 5A~5D is performed by using a designated protocol. For example, ISO 18000-6 type C protocol may be used as a standard protocol for an RFID tag which uses ultra high frequency (UHF) band extending from 860 MHz to 960 MHz.

The RFID tag reader 10 performs reading process of the RFID tags 5A~5D repeatedly under a predetermined reading condition. When the RFID tag reader 10 reads the RFID tags 5A~5D, the RFID tag reader 10 communicates with the RFID tags 5A~5D that are located in communication areas of the antennas 21 and 22, where radio waves transmitted from the antennas 21 and 22 can reach at some level of intensity or more.

The RFID tag reader 10 transmits data received from the RFID tags 5A~5D to the server 30 at a designated timing. The server 30 processes the data received from the RFID tag reader 10 by executing a designated computer program.

The server 30 transmits a command to the RFID tag reader 10 and causes the RFID tag reader 10 to read the RFID tags 5A~5D. Then the server 30 receives identifiers of the RFID tags 5A~5D that are read by the RFID tag reader 10. Hereinafter, the identifier of each of the RFID tags 5A~5D will be referred to as ID. The server 30 collects the IDs of the RFID tags 5A~5D that are read by the RFID tag reader 10 and transmits the IDs to a business application part.

In the RFID tag reading system 1 according to the first embodiment, the server 30 performs business applications using the RFID tag reader 10. The business application part performs logistics management of articles with the attached RFID tags 5A~5D, for example.

Each of the RFID tags 5A~5D includes an integrated circuit (IC) chip and an antenna as main components. The IC chip stores the ID in an internal memory. When the IC chip receives the read command from the RFID tag reader 10, the IC chip performs an answer process in order to transmit the ID to the RFID tag reader 10. The antenna is used for wireless communication with the RFID tag reader 10.

For example, the RFID tags 5A~5D are attached to articles that are to be identified. The articles may be articles delivered by logistics or may be personal belongings, for example.

The RFID tags 5A~5D may store data which represents kinds of the articles, manufacturing dates of the articles, or personal identifiers of owners of the personal belongings, in addition to the IDs. Hereinafter, in a case where the RFID tags 5A~5D are not distinguished, the RFID tags 5A~5D may be referred to as an RFID tag 5.

The RFID tag 5 used in the RFID tag reading system 1 may be a passive type RFID tag which communicates at the UHF range and gains power from the RFID tag reader 10 via the antenna included in the RFID tag. When the RFID tag 5 receives radio frequency wave signals transmitted from the antennas 21 and 22 of the RFID tag reader 10, current flowing through the antenna of the RFID tag 5 is generated. The IC chip of the RFID tag 5 is activated by the current.

The current generated in the RFID tag 5 is rectified and is supplied to the IC chip as a designated voltage, and then the RFID tag 5 is activated. Although the passive type RFID tag is used as the RFID tag 5 according to the first embodiment, the RFID tag 5 may be an active type RFID tag which includes a power source and is activated by the power source.

As illustrated in FIG. 1, the antennas 21 and 22 of the RFID tag reader 10 form a readable area 23 which is determined by the physical settings. The readable area 23 is obtained as a combined area of a readable area in which the antenna 21 can read the RFID tag 5 and a readable area in which the antenna 22 can read the RFID tag 5.

The readable area 23 is provided at a place where the logistics management of the articles or the like with the attached RFID tag 5 is performed.

Figure 2:
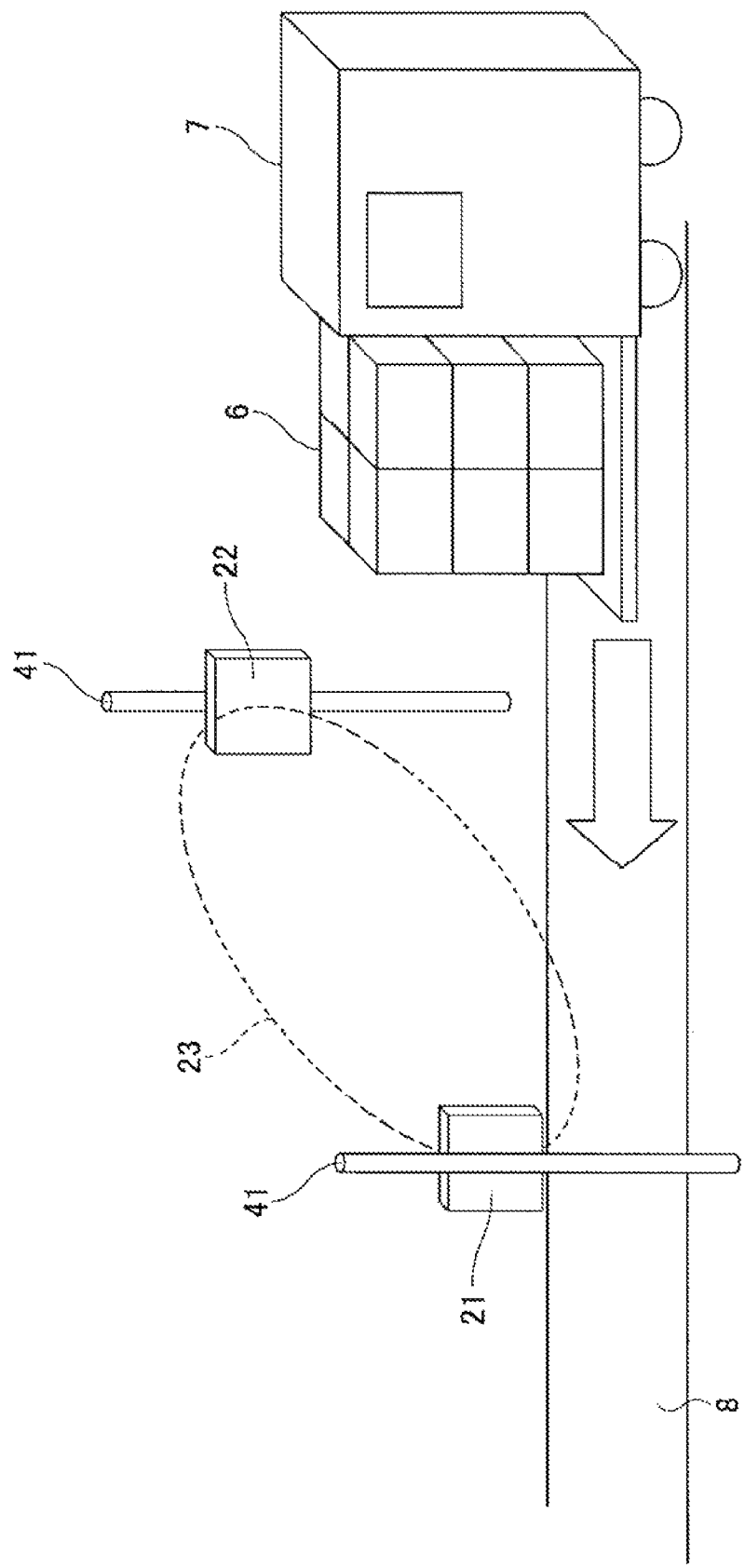
FIG. 2 is a diagram illustrating an exemplary readable area of the RFID tag reading system according to the first embodiment.

FIG. 2 is a diagram illustrating an exemplary readable area of the RFID tag reading system 1 according to the first embodiment.

For example, in a delivery center where an article with the attached RFID tag 5 is managed, a gate 41 is provided at an entrance of a space 8 where the article is loaded on a truck which has a particular delivery route, and the antennas 21 and 22 of the RFID tag reader 10 are attached to the gate 41.

Herein, in the delivery center, plural of the gates 41 and the readable areas 23 are provided. Each of the readable areas 23 is identified and managed by the RFID tag reader 10 and the server 30 by using identifiers of the readable areas 23.

When a forklift 7 on which the article 6 with the attached RFID tag 5 approaches the readable area 23 of the antennas 21 and 22, the RFID tag reader 10 reads the ID of the RFID tag 5. The ID which is read by the RFID tag reader 10 is transmitted to the server 30.

The server 30 associates the ID of the RFID tag 5 received from the RFID tag reader 10 with the identifier of the readable area 23 and registers them into a database in order to perform the logistics management.

The RFID tag reading system 1 may be used at the delivery center as illustrated in FIG. 2, for example.

Next, a hardware configuration of the RFID tag reading system 1 according to the first embodiment will be described with reference to FIG. 3.

Figure 3:
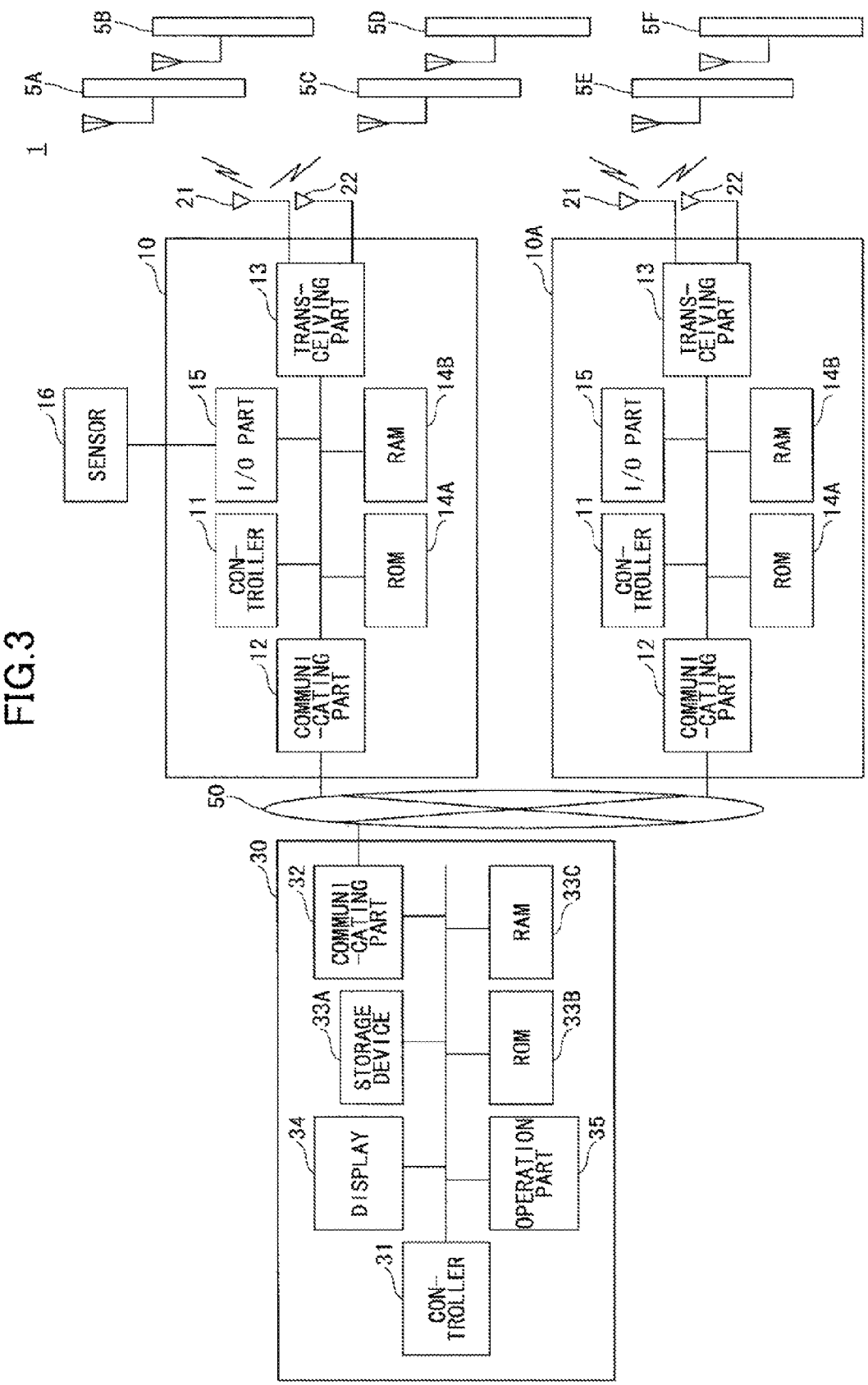
FIG. 3 is a diagram illustrating a hardware configuration of the RFID tag reading system according to the first embodiment.

FIG. 3 is a diagram illustrating a hardware configuration of the RFID tag reading system 1 according to the first embodiment.

The RFID tag reading system 1 includes the RFID tag readers 10 and 10A, the antennas 21 and 22, and the server 30.

As illustrated in FIG. 3, the two RFID readers 10 and 10A are connected to the server 30 via a network 50. The antennas 21 and 22 of the RFID tag reader 10 communicate with the RFID tags 5A~5D, and the antennas 21 and 22 of the RFID tag reader 10A communicate with RFID tags 5E and 5F.

The RFID tag reader 10A is similar to the RFID tag reader 10. Hereinafter, the RFID tag reader 10 will be described, and a description of the RFID tag reader 10A will be omitted. Each of the RFID tags 5E and 5E is similar to each of the RFID tags 5A~5D.

The RFID tag reader 10 includes a controller 11, a communicating part 12, a transceiving part 13, read only memory (ROM) 14A, a random access memory (RAM) 14B and an input and output (I/O) part 15. The antennas 21 and 22 are connected to the RFID tag reader 10. The controller 11, the communicating part 12, the transceiving part 13, the ROM 14A, the RAM 14B, the I/O part 15 and the antennas 21 and 22 are connected to each other via a bus. The RFID tag reader 10 is one example of an RFID tag reader.

The controller 11 includes a processing part such as a central processing unit CPU), a micro processing unit (MPU) or the like. The controller 11 is subject to an operating procedure stored in the ROM 14A and the RAM 14B and communicates with the RFID tags 5A~5D via the transceiving part 13 and the antennas 21 and 22 in order to perform the reading process.

The communicating part 12 performs data communication with the server 30 via the network 50. A communication module such as a local area network (LAN) of a wide area network (WAN) may be used as the communicating part 12, for example.

The RFID tag reader 10 performs a transceiving process with the RFID tags 5A~5D. In the transceiving process, the RFID tag reader 10 causes the transceiving part 13 to transmit data to the RFID tags 5A~5D, and to receive data from the RFID tags 5A~5D. The transceiving process of the transceiving part 13 will be described later.

The ROM 14A stores a control program which causes the controller 11 to operate. The control program stored in the ROM 14A is loaded into the RAM 14B when the controller 11 executes the control program.

A dynamic random access memory (DRAM), a static random access memory (SRAM), a flash memory or the like may be used as the RAM 14B.

Data which is generated when the controller 11 executes the control program is temporarily stored in the RAM 14B. The IDs of the RFID tags 5A~5D, various kinds of parameters required for executing the control program or the like may be stored in the RAM 14B as the temporarily stored data, for example.

A sensor 16 such as an optical sensor, a touch sensor, a contact sensor or the like is connected to the I/O part 15. The I/O part 15 is a type of interface to which a detection signal of the sensor 16 is input.

For example, the sensor 16 is provided in front of the antennas 21 and 22 (see FIG. 2) and detects an article, people or the like approaching to and passing by the antennas 21 and 22.

When the sensor 16 detects the article, people or the like passing by the antennas 21 and 22, the RFID tag reader 10 recognizes a passage of the article, the people or the like based on the detection signal input from the sensor 16 via the I/O part 15 and starts or ends the reading process of the RFID tags 5A~5D.

In particular, the RFID tag reader 10 performs the transceiving process with the RFID tags 5A~5D via the transceiving part 13 and the antennas 21 and 22 as described below.

First, the RFID tag reader 10 performs an inventory process of the RFID tags 5A~5D that are located in the readable area 23 (see FIGS. 1 and 2) of the antennas 21 and 22. In other words, the RFID tag reader 10 searches for the RFID tags 5A~5D that are located in the readable area 23 of the antennas 21 and 22. The RFID tags 5A~5D receive inventory commands transmitted from the RFID tag reader 10, and transmit ID data representing the IDs to the RFID tag reader 10 when the IC chips of the RFID tags 5A~5D are activated. The RFID tags 5A~5D transmit the ID data included in the response signals in response to the inventory commands. Accordingly, the RFID tag reader 10 recognizes the IDs of the RFID tags 5A~5D.

If the RFID tag reader 10 transmits the inventory command in a case where plural RFID tags such as the RFID tags 5A~5D are located in the readable area 23 of the antennas 21 and 22, the plural RFID tags 5A~5D may transmit the response signals to the RFID tag reader 10 at the same time. Then the response signals may cause interference, and the RFID tag reader 10 may not be able to receive the response signals. A situation as described above may occur when the response signals of the RFID tags 5A~5D come into collision with each other.

In order to avoid such a situation, collision arbitration functions are implemented in the RFID tags 5A~5D and the RFID tag reader 10

When the collision of the response signals occurs, the RFID tag reader 10 suppresses transmission of the response signals of the RFID tags 5A~5D by using a collision arbitration protocol determined between the RFID tag reader 10 and the RFID tags 5A~5D. As a result, the RFID tag reader 10 receives the response signals including the IDs from the RFID tags 5A~5D one by one. Accordingly, it is possible to avoid the collision of the response signals of the RFID tags 5A~5D and to identify the RFID tags 5A~5D by receiving the IDs from the RFID tags 5A~5D.

In a case where the RFID tags 5A~5D have data other than the IDs, it is possible to read or write the data between the RFID tag reader 10 and the RFID tags 5A~5D by transmitting data-read-commands or data-write-commands therebetween in two ways. An example of the data may be some information of the articles with the attached RFID tags 5A~5D.

The RFID tag reader 10 transmits the inventory command repeatedly to the readable area 23 subject to a predetermined condition. The RFID tag 5 transmits the data including the ID stored in the IC chip every time the RFID tag 5 receives the inventory command.

Accordingly, every time the RFID tag reader 10 transmits the inventory command, the RFID tags 5A~5D that are located in the readable area 23 of the antennas 21 and 22 transmit the response signals to the RFID tag reader 10. As a result, the RFID tag reader 10 receives the response signals from the RFID tags 5A~5D. If there is no problem with a radio wave environment around the readable area 23 as an ideal condition, a number of the response signals received by the RFID tag reader 10 from each of the RFID tags 5A~5D corresponds to a number of times the RFID tag reader 10 transmits the inventory commands.

The RFID tag reader 10 included in the RFID tag reading system 1 according to the first embodiment determines the response signal received from the unwanted RFID tag based on signal intensities of the response signals that are repeatedly received from each of the RFID tags 5A~5D.

Herein, the unwanted RFID tag means the RFID tag which is read by the RFID tag reader 10 at the gate 41 despite the tag does not pass through the gate 41. This is because the unwanted RFID tag is located close to the gate 41.

Particularly, for the RFID tag reading system which has a wider readable area, it sometimes happens that the RFID tag is read by the RFID tag reader 10 even in a case where the RFID tag does not pass through the gate 41 and is located close to the gate 41. When the forklift 7 or the like passes by the RFID tag which is located near the gate 41, a reflectional path of the response signal between the antennas 21 and 22 and the RFID tag may be formed. As a result, the unwanted RFID tag may be read by the RFID tag reader 10.

The RFID tag reading system 1 according to the first embodiment determines whether the detected RFID tag is an intended RFID tag or the unwanted RFID tag, and improves the reading accuracy of the RFID tag.

For example, in a case where the RFID tag reading system 1 is used for managing the articles with the attached RFID tags, the ID of an intended RFID tag has to be registered into the database. An intended RFID tag is an RFID tag which has to be registered into the database. The unwanted RFID tag is an RFID tag which is not to be registered into the database.

The server 30 includes a controller 31, a communicating part 32, a storage device 33A, a ROM 33B, a RAM 33C, a display 34 and an operation part 35. The controller 31, the communicating part 32, the storage device 33A, the ROM 33B, the RAM 33C, the display 34 and the operation part 35 are connected to each other via a bus.

The controller 31 includes a processing part such as a CPU, an MPU or the like. In a case where the controller 31 includes an MPU, the ROM 33B and the RAM 33C may be included in the controller 31

The controller 31 reads a control program stored in the storage device 33A or the ROM 33B, loads the control program into the RAM 33C and executes the control program. The controller 31 controls the communicating part 32, the display 34 or the like.

The controller 31 receives an answer signal which is generated by the controller 11 of the RFID tag reader 10 and registers the ID included in the answer signal into the database which is used for the logistics management. The answer signal is generated based on the response signal at an RFID tag reading process.

The communicating part 32 performs data communication with the RFID tag reader 10 via the network 50 and receives answer signals including the ID of the RFID tag 5. A communication module such as a local area network (LAN) of a wide area network (WAN) may be used as the communicating part 32, for example.

The storage device 33A is a type of non-volatile storage device such as a hard disk drive, a flash memory or the like. In the storage device 33A, a database used for managing the RFID tag 5, various kinds of computer programs that are used for activating the server 30, data used for executing the computer programs or the like may be stored.

The ROM 33B stores a control program which causes the controller 31 to operate. The control program stored in the ROM 33B is loaded in the RAM 33C by the controller 31 when the controller 31 executes the control program.

A dynamic random access memory (DRAM), a static random access memory (SRAM), a flash memory or the like may be used as the RAM 33C.

Data which is generated when the controller 31 executes the control program is temporarily stored in the RAM 33C. The data stored in the RAM 33C may include the ID of the RFID tag 5 included in the answer signal received from the RFID tag reader 10, parameters that are used for executing the control program or the like, for example. The ID of the RFID tag included in the answer signal is temporarily stored in the RAM 33C, and then is registered in the database stored in the storage device 33A.

The display 34 may be a liquid crystal display (LCD), for example. The display 34 displays an operational condition of the server 30, information input via the operation part 35, information which is to be reported to an operator of the RFID tag reading system 1 or the like based on commands input from the controller 31.

The operation part 35 is a type of interface device which is used by the operator, such as a keyboard and a mouse, for example.

The display 34 and the operation part 35 are an example of an interface part used by the operator. In a case where the information is displayed on a device, other than the display 34, which is connected to the server via the network 50, the server 30 may not include the display 34. In a case where the operator inputs the information into the server 30 via an interface device other than the operation part 35 via the network 50, the server 30 may not include the operation part 35.

Figure 4:
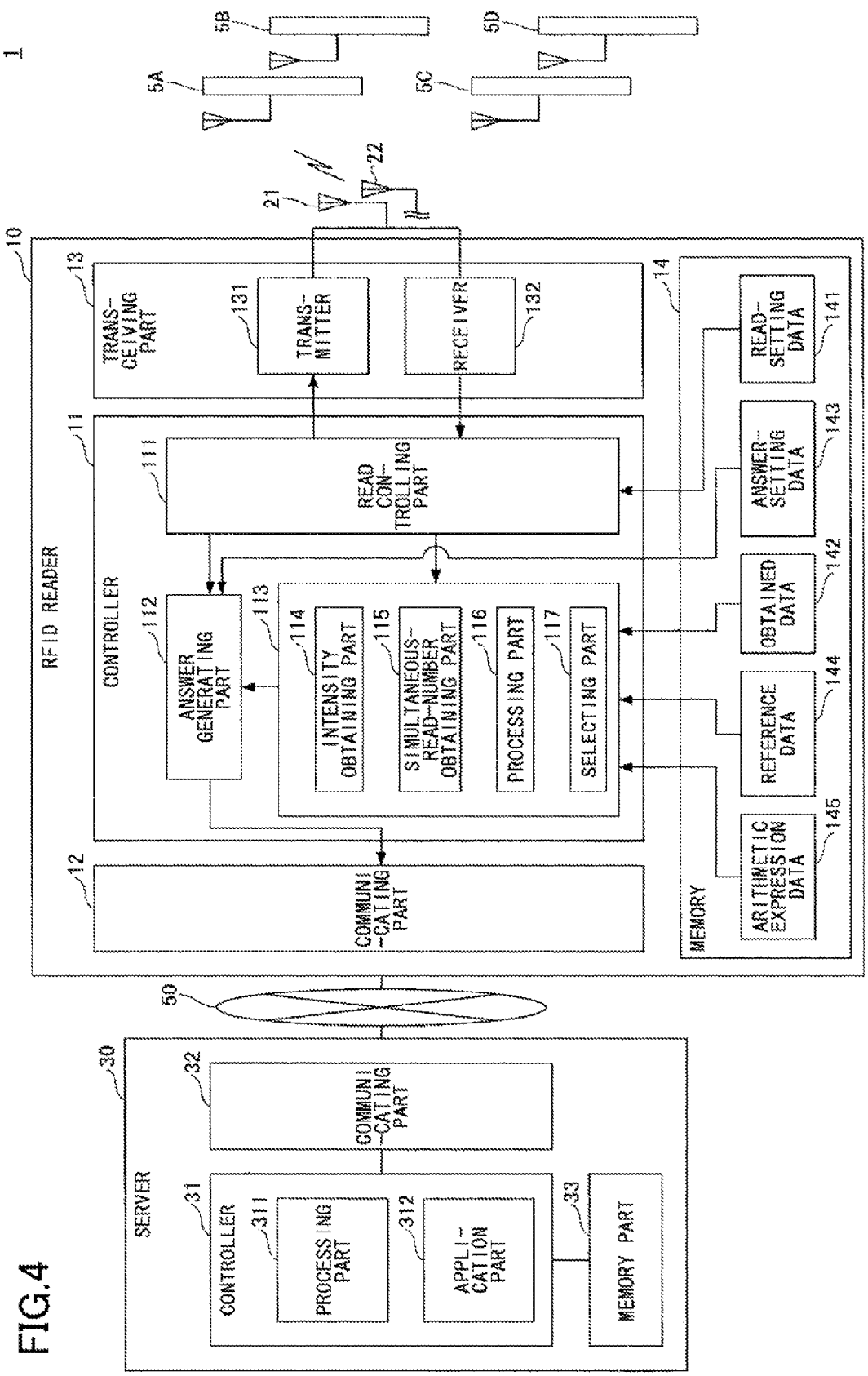
FIG. 4 is a diagram illustrating a configuration of the RFID tag reading system according to the first embodiment.

FIG. 4 is a diagram illustrating a configuration of the RFID tag reading system 1 according to the first embodiment. In FIG. 4, detailed configurations of the controller 11 of the RFID tag reader 10 and the controller 31 of the server 30 are illustrated compared with FIG. 3.

In FIG. 4, the I/O part 15, the display 34 and the operation part 35 (see FIG. 3) are omitted.

The RFID tag reader 10 includes the controller 11, the communicating part 12, the transceiving part 13 and a memory 14.

The controller 11 includes a read controlling part 111, an answer generating part 112 and a read processing part 113.

The read controlling part 111 performs the inventory process of the RFID tags 5A~5D via the transceiving part 13 based on a read-setting data 141 stored in the memory 14. The read controlling part 111 recognizes the IDs of the RFID tags 5A~5D received by the transceiving part 13 and calculates signal intensities (received signal strength indicator (RSSI) values) of the response signals of the RFID tags 5A~5D.

The answer generating part 112 generates the answer signals including the IDs of the RFID tags 5A~5D recognized by the read controlling part 111. The answer signals are transmitted to the server 30. The answer generating part 112 generates the answer signals based on the IDs of the RFID tags 5A~5D recognized by the read controlling part 111 and a select signal of the read processing part 113.

Relationship of the IDs of the RFID tags 5A~5D recognized by the read controlling part 111, the select signal of the read processing part 113, and the answer signals generated by the answer generating part 112 will be described later.

The read processing part 113 includes an intensity obtaining part 114, a simultaneous-read-number obtaining part 115, a processing part 116 and a selecting part 117.

The intensity obtaining part 114 obtains the signal intensity calculated by the read controlling part 111. Since the RFID tag reader 10 reads the RFID tags 5A~5D multiple times, the read controlling part 111 obtains plural read results of the RFID tags 5A~5D. Accordingly, the intensity obtaining part 114 obtains plural of the signal intensities that are calculated from the plural read results of the RFID tags 5A~5D.

The intensity obtaining part 114 obtains data representing Ith read process at which the signal intensity is obtained and an identifier of the antenna 21 or 22 from the read controlling part 111. Herein, the Ith read process is an Ith process of a read sequence performed by RFID tag reader 10. I is an integer number greater than or equal to one. In the read sequence, the RFID tag reader 10 performs the read process multiple times.

The intensity obtaining part 114 generates a read pattern data in which the signal intensities generated from the received signal strength indicator (RSSI) values obtained from the read controlling part 111 are arranged in chronological order.

The simultaneous-read-number obtaining part 115 obtains a simultaneous-read-number of the RFID tags 5 based on the IDs recognized by the read controlling part 111 at each read process of the read sequence performed by RFID tag reader 10. The simultaneous-read-number represents number of the RFID tags 5 that is read by the RFID tag reader 10 at the single read process. The simultaneous-read-number obtaining part 115 generates a list of the simultaneous-read-numbers which represents the simultaneous-read-numbers at all of the read processes of the read sequence.

The processing part 116 performs a weighting process in which the processing part 116 gives weight to the signal intensity obtained by the intensity obtaining part 114. In the weighting process, the processing part 116 gives the weights to the signal intensities based on the simultaneous-read-numbers obtained by the simultaneous-read-number obtaining part 115.

The processing part 116 gives the larger weights to the signal intensities of the RFID tags 5 that are read at the read process in which the greater simultaneous-read-number is obtained. On the contrary, the processing part 116 gives the smaller weight to the signal intensities of the RFID tags 5 that are read at the read process in which the lesser simultaneous-read-number is obtained.

The selecting part 117 sorts the RFID tags 5 based on a weighted mean signal intensity calculated by the processing part 116 and generates the select signal which represents necessity or unnecessity (lack of necessity) of registration of the ID of the RFID tag 5 into the database. The weighted mean signal intensity is a mean value of weighted signal intensities. The weighted mean signal intensity will be described later.

The selecting part 117 selects the RFID tag 5 of which the weighted mean signal intensity is greater than a designated reference value. In this case, the selecting part 117 generates the select signal which represents necessity of registration of the ID of the RFID tag 5 into the database. The selecting part 117 does not select the RFID tag 5 of which the weighted mean signal intensity is less than or equal to the designated reference value. In this case, the selecting part 117 generates the select signal which represents unnecessity of registration of the ID of the RFID tag 5 into the database.

The weighting process is performed by the processing part 116 based on a ratio of the maximum value of the simultaneous-read-numbers obtained at all of the read processes of the read sequence and the simultaneous-read-number obtained at each of the read processes.

The weighting process is performed for the sake of sorting the RFID tags 5 into the intended RFID tag(s) 5 and the unwanted RFID tag(s) 5 and thereby improving the reading accuracy of the RFID tags 5. The select signal representing the necessity of the registration of the ID into the database is generated for the intended RFID tag by the selecting part 117. The select signal representing the unnecessity of the registration of the ID into the database is generated for the unwanted RFID tag 5 by the selecting part 117.

The selecting part 117 sorts read results of the RFID tags 5 in order to filter out read result(s) of the unwanted RFID tag(s) 5.

The communicating part 12 is the same as the communicating part 12 as illustrated in FIG. 3. The transceiving part 13 includes a transmitter 131 and a receiver 132. The transmitter 131 is a type of transmitting circuit included in the transceiving part 13. The receiver 132 is a type of receiving circuit included in the transceiving part 13. The receiver 132 of the transceiving part 13 obtains the read result of the RFID tag(s) 5. The receiver 132 inputs the read result to the read controlling part 111.

The communicating part 12 transmits the answer signal generated by the answer generating part 112 to the server 30 by using a designated protocol of the network 50.

The ROM 14A and the RAM 14B illustrated in FIG. 3 are illustrated as the memory 14 in FIG. 4. The memory 14 is realized by the ROM 14A and the RAM 14B.

The read-setting data 141, an obtained data 142, an answer-setting data 143, a reference data 144 and an arithmetic expression data 145 are stored in the memory 14.

The read-setting data 141 includes the identifiers (IDs) of the antennas 21 and 22, and data which represents order of use of the antennas 21 and 22. The antennas 21 and 22 are used alternately. The read-setting data 141 further includes data which represents number of times the RFID tag reader 10 transmits the inventory command, and data which represents period of time in which the RFID tag reader 10 transmits the inventory command. The read-setting data 141 further includes other data which is necessary for reading the RFID tags 5. In a case where the RFID tag reader 10 reads data other than the ID from the RFID tags 5 or writes data to the RFID tags 5, a designated command used for reading the data or writing the data is further stored in the read-setting data 141.

The obtained data 142 is a type of data in which the read pattern data, the simultaneous-read-number, and the identifiers of the antennas 21 and 22 are associated. The read pattern data is generated by the intensity obtaining part 114 of the read processing part 113. In the read pattern data, the signal intensities generated from the RSSI values of the response signals are arranged in chronological order for each ID of the RFID tag 5 and for each read process. The read controlling part 111 obtains the response signal from the RFID tag 5 as a response to the inventory command.

The answer-setting data 143 includes data which represents a control data used for generating the answer commands including the IDs of the RFID tags 5, and data which represents timings at which the RFID tag reader 10 transmits the answer commands to the server 30. The IDs of the RFID tags 5 are transmitted from the RFID tag reader 10 to the server in a state where the IDs are included in the answer command.

The answer generating part 112 refers to the answer-setting data 143 and generates the answer commands based on the IDs of the RFID tags 5 recognized by the read controlling part 111 and the select signals generated by the selecting part 117 of the read processing part 113.

The reference data 144 is a type of data which represents the designated reference value used by the selecting part 117 when the selecting part 117 sorts the RFID tag (s) 5. The selecting part 117 sorts the RFID tag (s) by determining whether the weighted mean signal intensity of the RFID tag 5 is greater than the designated reference value or not. The designated reference value may be set to a value which is obtained by conducting experimental tests in the RFID tag reading system 1.

The arithmetic expression data 145 is data which represents formulae that are used by the read processing part 113 in order to calculate the weighted mean signal intensity R_x.

The read controlling part 111 reads the read-setting data 141 stored in the memory 14 in order to perform a read control process and reads the IDs of the RFID tags 5.

The read controlling part 111 follows a procedure defined by the read-setting data 141 and controls the transceiving part 13 so that the transceiving part 13 transmits the inventory commands to the RFID tags 5. Then the read controlling part 111 receives the response signals from the RFID tags 5.

The RFID tag reader 10 obtains data in which the response signals received from the RFID tag(s) 5 are arranged in chronological order by sending the inventory commands to the RFID tag(s) 5 repeatedly.

The read controlling part 111 obtains the RSSI value of each of the response signals when the read controlling part 111 receives the response signals from the RFID tags 5. The data in which the response signals are arranged in chronological order includes the signal intensities generated from the RSSI values of the response signals.

The RSSI value of the response signal of the RFID tag 5 is represented as a fractional value ranging from −70 dBm to −20 dBm, for example. It is not easy to handle the fractional value as described above. Accordingly, the RFID tag reading system 1 of the first embodiment handles the signal intensities generated from the RSSI value of the response signal of the RFID tag 5. The generating process of the signal intensities of the RFID tag 5 will be described later.

Since the RFID tag reader 10 may receive plural of the response signals from the RFID tags 5, the RFID tag reader 10 may obtain plural of the IDs. Accordingly, the read processing part 113 generates the read pattern data in which the signal intensities are arranged in chronological order for each ID of the RFID tag 5.

The read pattern data is a type of data in which the signal intensities are arranged in chronological order for each ID of the RFID tag 5. The read pattern data represents a time distribution of the signal intensities. The read pattern data is generated by the intensity obtaining part 114 of the read processing part 113.

The read controlling part 111 follows the read-setting data 141 and transmits the inventory commands repeatedly to the RFID tags 5 by using the antennas 21 and 22 alternately. The response to the inventory command includes a data in which the ID of the antenna 21 or 22, the ID of the RFID tag 5 recognized by the read controlling part 111, and the RSSI value are associated with each other. The response to the inventory command is input to the read processing part 113 from the read controlling part 111.

The read processing part 113 collects the RSSI values and generates the data in which the signal intensities are arranged in chronological order for each ID of the RFID tag 5. The read processing part 113 stores the data into the memory 14 as the obtained data 142. In a case where there are plural of the readable areas 23, the read processing part 113 generates the data in which the signal intensities are arranged in chronological order for each ID of the RFID tag 5 and for each readable area 23 and stores the data into the memory 14 as the obtained data 142.

The read processing part 113 generates data in which the simultaneous-read-numbers are arranged in chronological order for each read process and stores the data into the memory 14 as a part of the obtained data 142.

Next, a configuration of the server 30 as illustrated in FIG. 4 will be described.

The server 30 includes the controller 31, the communicating part 32 and a memory part 33.

The controller 31 includes a processing part 311 and an application part 312.

The processing part 311 performs a conversion process in which the processing part 311 converts the answer received from the RFID tag reader 10 into a form which is required by the application part 312 and outputs the converted answer to the application part 312.

The application part 312 uses the converted answer to perform an operation in accordance with manufacturing, logistics, stock control or the like, for example. For example, in a case where the RFID tag reading system 1 is used in the delivery center as illustrated in FIG. 2, the application part 312 performs the logistics management of articles with the attached RFID tags 5 that pass through the gate 41.

The communicating part 32 is the same as the one illustrated in FIG. 3. The communicating part 32 follows the protocol of the network 50 and communicates with the communicating part 12 of the RFID tag reader 10. The communicating part 32 receives the answer command from the communicating part 12 of the RFID tag reader 10.

The ROM 33A and the RAM 33B as illustrated in FIG. 3 are illustrated as the memory part 33. The memory part 33 is realized by the ROM 33A and the RAM 33B.

The memory part 33 stores data which represent an identifier of the RFID tag reader 10 from which the server 30 can receive the answer commands, an identifier of the gate 41 (see FIG. 2) or the like.

FIG. 5 is a diagram illustrating a relationship between the RSSI values and the signal intensities represented as integer values that are used in the RFID tag reading system 1 according to the first embodiment. The integer values are obtained by encoding the RSSI values under a designated encoding rule as described below with reference to FIG. 5.

According to the RFID tag reading system 1 of the first embodiment, the RSSI values are encoded into the signal intensities represented as integer as illustrated in FIG. 5.

Ina case where the RSSI value r is less than −57.5 dBm (r<−57.5 dBm), the signal intensity is generated as the integer value of '1'. In a case where the RSSI value r is greater than or equal to −57.5 dBm and less than −56.5 dBm (−57.5 dBm<=r<−56.5 dBm), the signal intensity is generatedas the integer value of '2'.

In a manner as described above, the RSSI value r is encoded into the integer signal intensity value for every 10 dBm as illustrated in FIG. 5.

In FIG. 5, only the integer values of '1', '2', '10', '11', '21', '22', '22', '31' and '32' are illustrated as representative values, the RSSI value which may take a value less than −57.5 dBm, a value between −57.5 dBm and −27.5 dBm, or a value greater than −27.5 dBm is encoded into any one of the thirty two integer values from '1' to '32'.

Herein, the integer signal intensity values of '1', '2', '10', '11', '21', '22', '22', '31' and '32' illustrated in FIG. 5 are obtained in the cases as described below.

In a case where the RSSI value r is less than −57.5 dBm (r<−57.5 dBm), the signal intensity is generated as the integer value of '1'. In a case where the RSSI value r is greater than or equal to −57.5 dBm and less than −56.5 dBm (−57.5 dBm<=r<−56.5 dBm), the signal intensity is generated as the integer value of '2'.

In a case where the RSSI value r is greater than or equal to −49.5 dBm and less than −48.5 dBm (−49.5 dBm<=r<−48.5 dBm), the signal intensity is generated as the integer value of '10'. In a case where the RSSI value r is greater than or equal to −48.5 dBm and less than −47.5 dBm (−48.5 dBm<=r<−47.5 dBm), the signal intensity is generated as the integer value of '11'.

In a case where the RSSI value r is greater than or equal to −38.5 dBm and less than −37.5 dBm (−38.5 dBm<=r<−37.5 dBm), the signal intensity is generated as the integer value of '21'. In a case where the RSSI value r is greater than or equal to −37.5 dBm and less than −36.5 dBm (−37.5 dBm<=r<−36.5 dBm), the signal intensity is generated as the integer value of '22'.

In a case where the RSSI value r is greater than or equal to −28.5 dBm and less than −27.5 dBm (−28.5 dBm<=r<−27.5 dBm), the signal intensity is generated as the integer value of '31'. In a case where the RSSI value r is equal to or greater than −27.5 dBm (−27.5 dBm<=r), the signal intensity is generated as the integer value of '32'.

Herein, the encoding rule as illustrated in FIG. 5 is one example. The RSSI values may be encoded by a designated encoding rule other than the encoding rule as illustrated in FIG. 5. Further, the RSSI values may not be encoded, and the signal intensities represented as fractional values may be used instead of the integer values as illustrated in FIG. 5.

In the following, a relationship of the signal intensities read by the RFID tag reading system 1 in chronological order, the IDs of the RFID tags 5, the IDs of the antennas 21 and 22, the simultaneous-read-number of the RFID tag(s) 5 will be described with reference to FIG. 6. Hereinafter, the ID of each the antennas 21 and 22 may be referred to as antenna ID.

FIG. 6 is a diagram illustrating an example of the relationship of the signal intensities read by the RFID tag reading system 1 in chronological order, the IDs of the RFID tags 5, the antenna IDs, and the simultaneous-read-number of the RFID tag(s) 5. Hereinafter, a case where the RFID tag reader 10 reads the IDs of the eight RFID tags that are similar to the RFID tags 5A~5D (see FIGS. 3 and 4) will be described.

Data of the signal intensities, the Ith read process, the IDs of the RFID tags, the antenna IDs and the simultaneous-read-numbers as illustrated in FIG. 6 is an example of an empirical data obtained from a demonstration test performed by the RFID tag reading system 1 according to the first embodiment.

FIG. 6(A) illustrates the signal intensities of the eight RFID tags 5 (ID1-ID8) that are obtained by the twelve read processes (T1-T12) repeatedly performed by the RFID tag reader 10. The twelve read processes (T1-T12) are performed from the first read process (the read process T1) to the twelfth read process (the read process T12) in a continuous manner. Herein, the eight IDs (ID1-ID8) represent an order in which the RFID tag reader 10 reads the eight RFID tags 5. Accordingly, the eight IDs (ID1-ID8) do not represent the IDs that are registered in the IC chips of the eight RFID tags 5. The eight IDs (ID1-ID8) are used for descriptive purpose in order to represent the order in which the RFID tag reader 10 reads the eight RFID tags 5. The RFID tag 5 represented by the ID7 among the eight RFID tags (ID1-ID8) is read by the RFID tag reader 10 without passing through the gate 41 (see FIG. 2) in the demonstration test performed by the RFID tag reading system 1.

FIG. 6(A) illustrates on example of the read pattern data in which the signal intensities of the response signals are arranged in chronological order for each ID of the eight RFID tags (ID1-ID8) and for each read process. The read processing part 113 generates the read pattern data as illustrated in FIG. 6(A) by arranging the signal intensities of the response signals of the eight RFID tags (ID1-ID8) in chronological order for each ID of the eight RFID tags (ID1-ID8) and for each read process. The read pattern data is generated by the intensity obtaining part 114 of the read processing part 113.

The signal intensities as illustrated in FIG. 6(A) are obtained by the encoding process which is performed on the basis of the relationship between the signal intensities and the integer values as illustrated in FIG. 5.

FIG. 6(B) illustrates the antenna IDs of the antennas 21 and 22 that read the eight RFID tags (ID1-ID8) repeatedly and alternately from the read process T1 to the read process T12. The antenna IDs as illustrated in FIG. 6(B) represent the antenna IDs of the antennas 21 and 22 as illustrated in FIGS. 3 and 4. ID='1' represents the antenna ID of the antenna 21, and ID='2' represents the antenna ID of the antenna 22.

Each of the antenna IDs as illustrated in FIG. 6(B) is obtained at the same time as the intensity obtaining part 114 obtains the signal intensity (RSSI value) from the read controlling part 111.

FIG. 6(C) illustrates the simultaneous-read-numbers of the RFID tag(s) read by the RFID tag reader 10 for each of the read processes T1 to T12. FIG. 6(C) illustrates the simultaneous-read-numbers obtained in a case where the RFID tag reader 10 transmits the inventory commands to the eight RFID tags twelve times from the reading process T1 to the read process T12 in a continuous manner. The data illustrated in FIG. 6(C) is one example of a list of simultaneous-read-numbers.

The signal intensities as illustrated in FIG. 6(A) and the antenna IDs as illustrated as FIG. 6(B) are obtained by the intensity obtaining part 114 from the read controlling part 111. The antenna IDs correspond to the identifiers of the antennas 21 and 22.

The simultaneous-read-numbers as illustrated in FIG. 6(C) are obtained by the simultaneous-read-number obtaining part 115 from the read controlling part 111.

The data as illustrated in FIGS. 6(A) to 6(C) is a type of data in which the read pattern data, the simultaneous-read-number, and the antenna IDs are associated. The read pattern data is generated by the intensity obtaining part 114 of the read processing part 113. In the read pattern data, the signal intensities of the response signals are arranged in chronological order for each ID of the RFID tag 5 and for each read process. The read controlling part 111 obtains the response signal from the RFID tag 5 as the response to the inventory command.

According to the data as illustrated in FIGS. 6(A) to 6(C), the simultaneous-read-numbers are '0' at the read processes T1, T2 and T3, and the antenna IDs are '1', '2' and '1' at the read processes T1, T2 and T3. In other words, the RFID tags 5 are not read at the read processes T1, T2 and T3.

At the read process T4, the antenna 22 of which the antenna ID is '2' is used, and the RFID tags 5 having ID1 and ID2 are read by the antenna 22. Accordingly, the simultaneous-read-number is '2' at the read process T4.

At the read process T5, the antenna 21 of which the antenna ID is '1' is used, and the RFID tags 5 having ID3 and ID4 are read by the antenna 21. Accordingly, the simultaneous-read-number is '2' at the read process T5.

At the read process T6, the antenna 22 of which the antenna ID is '2' is used, and the RFID tags 5 having ID1, ID2, ID5 and ID6 are read by the antenna 22. Accordingly, the simultaneous-read-number is '4' at the read process T6.

At the read process T7, the antenna 21 of which the antenna ID is '1' is used, and the RFID tags 5 having ID1, ID4 and ID5 are read by the antenna 21. Accordingly, the simultaneous-read-number is '3' at the read process T7.

At the read process T8, the antenna 22 of which the antenna ID is '2' is used, and the RFID tags 5 having ID1 to ID8 are read by the antenna 22. Accordingly, the simultaneous-read-number is '8' at the read process T8.

At the read process T9, the antenna 21 of which the antenna ID is '1' is used, and the RFID tags 5 having ID2, ID3, ID4, ID5 and ID8 are read by the antenna 21. Accordingly, the simultaneous-read-number is '5' at the read process T9.

At the read process T10, the antenna 22 of which the antenna ID is '2' is used, and the RFID tag 5 having ID7 is read by the antenna 22. Accordingly, the simultaneous-read-number is '1' at the read process T10.

At the read process T11, the antenna 21 of which the antenna ID is '1' is used, but none of the RFID tags 5 having ID1 to ID8 is read by the antenna 21. Accordingly, the simultaneous-read-number is '0' at the read process T11.

At the read process T12, the antenna 22 of which the antenna ID is '2' is used, and the RFID tag 5 having ID7 is read by the antenna 22. Accordingly, the simultaneous-read-number is '1' at the read process T12.

As described above, according to the RFID tag reading system 1, the antennas 21 and 22 are used alternately at each of the read processes in order to read the RFID tag(s) 5.

Next, the RFID tag reading process executed by the RFID tag reading system 1 according to the first embodiment will be described with reference to FIG. 7. The RFID tag reading process as illustrated in FIG. 7 is executed by the controller 11 of the RFID tag reader 10.

Figure 7:
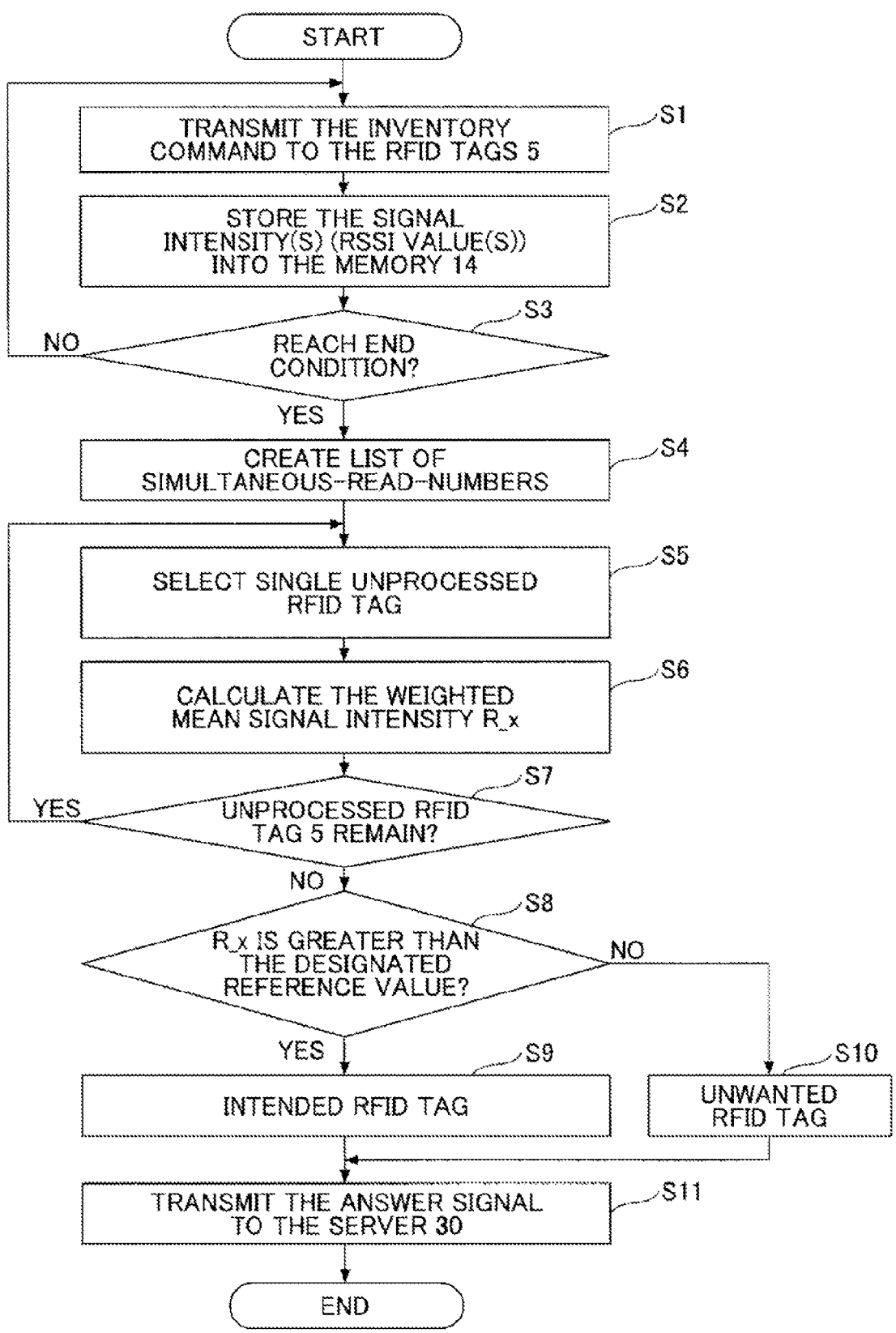
FIG. 7 is a flowchart illustrating steps of a RFID tag reading process executed by the RFID tag reader.

The RFID tag reading process as illustrated in FIG. 7 is realized by performing the method for processing the RFID tag reading process of the first embodiment, and is realized by executing the program of the reading process of the first embodiment.

FIG. 7 is a flowchart illustrating steps of the RFID tag reading process executed by the RFID tag reader 10. The RFID tag reading process as illustrated in FIG. 7 is executed by the controller 11 of the RFID tag reader 10.

The controller 11 transmits the inventory command to the RFID tags 5 via the transceiving part 13 by following to the read-setting data 141 stored in the memory 14, recognizes the ID(s) of the RFID tag(s) 5, and calculates the signal intensity(s) (RSSI value(s)) (step S1).

The signal intensity(s) (RSSI value(s)) is input to the intensity obtaining part 114. The process of step S1 is executed by the read controlling part 111 of the controller 11.

Next, the controller 11 stores the signal intensity(s) (RSSI value(s)) obtained at step S1 into the memory 14 (step S2). The signal intensity(s) (RSSI value(s)) is stored into the memory 14 with data representing the read process (any one of T1 to T12) and the antenna ID. The process of step S1 is executed by the intensity obtaining part 114 of the controller 11.

Next, the controller 11 determines whether the read process reaches an end condition (step S3). The controller 11 determines that the RFID tag reading process reaches the end condition when the number of the read processes reaches a designated number included in the read-setting data 141.

Herein, the designated number represents twelve. The process of step S1 is executed by the read controlling part 111 of the controller 11.

Next, the controller 11 creates a list of simultaneous-read-numbers (step S4). The list of the simultaneous-read-numbers is a type of list which represents the number of the RFID tag(s) 5 which is read by the RFID tag reader 10 at each of the read processes, as illustrated in FIG. 6(C). The list of the simultaneous-read-numbers created by the controller 11 is stored into the memory 14 as the obtained data 142. The process of the step S4 is executed by the simultaneous-read-number obtaining part 115.

Next, the controller 11 selects the single ID of the RFID tag 5 of which the weighted mean signal intensity is not calculated yet, and obtains the twelve signal intensities of the RFID tag 5 corresponding to the selected ID (step S5). The controller 11 executes the process of step S5 repeatedly by executing a routine including steps S5 to S7. At step S5, the controller 11 selects the single ID from the eight IDs (ID1-ID8). The twelve signal intensities are obtained at the read processes T1 to T12. Hereinafter, the RFID tag 5 of which the weighted mean signal intensity is not calculated yet is referred to an unprocessed RFID tag. The controller 11 selects the single ID in an order in which the RFID tag reader 10 reads the eight RFID tags 5, i.e. in the order from ID1 to ID8. In other words, the eight RFID tags are selected one by one in descending order in the read pattern data as illustrated in FIG. 6(A) when the controller 11 executes the routine including steps S5 to S7. Since the read pattern data as illustrated in FIG. 6(A) includes the eight IDs (ID1-ID8), the controller 11 selects one of the eight IDs (ID1-ID8) one by one in the order from ID1 to ID8 when the controller 11 executes the routine including steps S5 to S7. In particular, the process of step S5 is executed by the processing part 116 of the controller 11.

Next, the controller 11 calculates the weighted mean signal intensity R_x of the RFID tag 5 corresponding to the selected ID while weighting the signal intensities of the RFID tag 5 (step S6). The weighted mean signal intensity R_x is calculated from the signal intensities obtained at the twelve read processes T1 to T12 of the RFID tag 5 corresponding to the selected ID. The weighted mean signal intensity R_x is a mean value of weighted signal intensities. In particular, the process of step S6 is executed by the processing part 116 of the controller 11.

Herein, the read result P(x) of the RFID tag 5 having the identifier IDx (1<=x<=8) is represented as p_1, p_2, . . . , p_m, and the read result p_j (1<=j<=m) is represented as p_j=<a_j, r_j, n_j>.

The value of a_j takes '1' when the RFID tag reader 10 reads the RFID tag 5 having the identifier IDx and takes '0' when the RFID tag reader 10 does not read the RFID tag 5 having the identifier IDx.

The value of r_j takes the integer value which is obtained by encoding the signal intensity (RSSI value) of the RFID tag 5 having the identifier IDx under the designated encoding rule as illustrated in FIG. 5.

The value of n_j represents the simultaneous-read-number obtained at each read process. Accordingly, n_j represents the number of the RFID tags 5 including the RFID tag 5 having the identifier IDx at the same read process. For example, in a case where the eight RFID tags 5 are used in the RFID tag reading system 1, n_j takes any number from '0' to '8'.

The weighted mean signal intensity R_x of the RFID tag 5 having the identifier IDx is calculated by a formula (1) as described below by using the read result P(x).

$$R\_x = \left\{ \sum_{j=1}^{m} a\_j \times r\_j \times (n\_j / Mn) \right\} \Big/ s\_x \quad (1)$$

Herein, Mn represents the maximum value of the simultaneous-read-numbers obtained from the read process T1 to the read process T12, and s_x represents the number of times that the RFID tag reader 10 reads the RFID tag(s) 5 among the twelve read processes with regard to the RFID tag 5 having the identifier IDx. The maximum simultaneous-read-number Mn is the maximum value of the simultaneous-read-numbers obtained from the read process T1 to the read process T12.

According to formula (1), the weighted mean signal intensity R_x is calculated by weighting the signal intensity (RSSI value) of the RFID tag 5 having the identifier IDx obtained at each read process by a ratio n_j/Mn of the simultaneous-read-number n_j and the maximum simultaneous-read-number Mn, and by deriving a mean value of all of the weighted signal intensities obtained with regard to the RFID tag 5 having the identifier IDx.

Accordingly, the greater the simultaneous-read-number becomes, the greater the signal intensity (RSSI value) is weighted. On the contrary, the less the simultaneous-read-number becomes, the less the signal intensity (RSSI value) is weighted.

Data representing formula (1) is included in the arithmetic expression data 145 stored in the memory 14. The processing part 116 of the controller 11 calculates the weighted mean signal intensity R_x by using the data of formula (1) included in the arithmetic expression data 145. The data of formula (1) included in the arithmetic expression data 145 is stored in the ROM 14A (see FIG. 3), and the data of formula (1) is loaded in the RAM 14B when the processing part 116 calculates the weighted mean signal intensity R_x.

The controller 11 determines whether the unprocessed RFID tag 5 remains (step S7). In other words, the controller 11 determines whether the weighted mean signal intensity R_x is calculated for all of the IDs of the RFID tags 5 included in the obtained data 142. In particular, the process of step S7 is executed by the processing part 116 of the controller 11.

If the controller 11 determines that the unprocessed RFID tag 5 does not remain at step S7 (S7 NO), the controller determines whether each weighted mean signal intensity R_x is greater than the designated reference value (step S8). The process of step S8 is performed with regard to each of the weighted mean signal intensities R_xs obtained by executing the process of step S6 repeatedly. Data of the designated reference value is stored in the memory 14 as the reference data 144. In particular, the process of step S8 is executed by the selecting part 117 of the controller 11.

If the controller 11 determines that the weighted mean signal intensity R_x is greater than the designated reference value at step S8 (S8 YES), the controller 11 determines that the RFID tag 5 is the intended RFID tag (step S9). In other words, at step S9, the controller 11 determines that it is necessary to register the RFID tag 5 of which the weighted mean signal intensity R_x is greater than the designated reference value. The selecting part 117 inputs the ID of the intended RFID tag which is determined at step S9 and a determination result of step S9 to the answer generating part 112. The determination result of step S9 represents that it is necessary to register the intended RFID tag into the database.

If the controller 11 determines that the weighted mean signal intensity R_x is not greater than the designated reference value at step S8 (S8 NO), the controller 11 determines that the RFID tag 5 is the unwanted RFID tag (step S10). In other words, at step S10, the controller 11 determines that it is not necessary to register the RFID tag 5 of which the weighted mean signal intensity R_x is not greater than the designated reference value. The selecting part 117 inputs the ID of the unwanted RFID tag which is determined at step S10 and a determination result of step S10 to the answer generating part 112. The determination result of step S10 represents that it is not necessary to register the unwanted RFID tag into the database.

By executing the steps S9 and S10, the IDs of the intended RFID tag(s) and the unwanted RFID tag(s) and the determination results of steps S9 and S10 are input to the answer generating part 112.

The selecting part 117 sorts the RFID tags 5 based on the weighted mean signal intensity calculated by the processing part 116 and generates the select signal by executing the processes of steps S8 to S10 in a manner as described above. The selecting part 117 generates the select signal which represents necessity or unnecessity of registration of the ID of the RFID tag 5 into the database.

When the controller 11 finishes the processes of step S9 or S10, the controller 11 generates the answer signal and transmits the answer signal to the server 30 (step S11). The process of step S11 is executed by the answer generating part 112 of the controller 11.

The answer generating part 112 generates the answer signals based on the IDs of the RFID tags 5 recognized by the read controlling part 111 and the select signal of the read processing part 113.

The answer signal is a type of signal in which the ID of the RFID tag 5 recognized by the read controlling part 111 and the select signal are associated with each other. The select signal represents necessity or unnecessity of registration of the ID of the RFID tag 5 into the database. The answer generating part 112 transmits the answer signal to the server 30 via the communicating part 12.

When the controller 31 of the server 30 receives the answer signal, the controller 31 registers the ID to which the select signal representing the necessity of the registration of the ID is associated into the database. In other words, the controller 31 registers the ID of the intended RFID tag into the database, but does not register the ID of the unwanted RFID tag into the database. Accordingly, the IDs of the RFID tags that pass through the gate 41 (see FIG. 2) are registered into the database of the server 30.

In a case where the controller 11 determines that the unprocessed RFID tag 5 remains at step S7 (S7 NO), the controller 11 returns to step S1. Accordingly, the processes of steps S5 to S7 are executed repeatedly, and the weighted mean signal intensity R_x is calculated at step S6 for all of the RFID tags 5.

Next, a method for sorting the eight RFID tags (ID1~ID8) by using the weighted mean signal intensities R_xs in a case where the list of the simultaneous-read-numbers including the read pattern data, antenna ID and simultaneous-read-number as illustrated in FIGS. 6(A), 6(B) and 6(C) is obtained.

FIG. 8 is a diagram illustrating the weighted mean signal intensities R_xs of the RFID tags (ID1, ID2 and ID7) obtained by the RFID tag reading system 1.

In FIG. 8, the weighted mean signal intensities R_xs of the RFID tags 5 (ID1, ID2 and ID7) are illustrated. The three RFID tags 5 (ID1, ID2 and ID7) are representatives of the eight RFID tags 5. In FIG. 8, the maximum simultaneous-read-number Mn, the number of times s_x, a value of numerator of formula (1), the weighted mean signal intensity R_x, and a mean signal intensity RA_x are illustrated. The maximum simultaneous-read-number Mn is the maximum value of the simultaneous-read-numbers obtained from the read process T1 to the read process T12. The number of times s_x represents number of times that the RFID tag reader 10 reads the RFID tag(s) 5 among the twelve read processes with regard to the RFID tag 5 having the identifier IDx. The value of numerator Num of formula (1) is calculated by a formula (IA) as described below. The mean signal intensity RA_x represents a mean value of the signal intensities of the RFID tag having the identifier IDx obtained at the twelve read processes T1 to T12. The mean signal intensity RA_x is obtained by calculating a mean value of the signal intensities of the RFID tag having the identifier IDx without weighting the signal intensities. Accordingly, the difference between the weighted mean signal intensity R_x and the mean signal intensity RA_x is whether it is weighted or not.

$$Num = \sum_{j=1}^{m} a\_j \times r\_j \times (n\_j/Mn) \quad (1A)$$

As described above, the data of the read pattern data, the antenna IDs and the list of the simultaneous-read-numbers as illustrated in FIGS. 6(A)~6(C) is an example of an empirical data obtained from a demonstration test performed by the RFID tag reading system 1 according to the first embodiment. The data is obtained from a demonstration test in that the RFID tags having the identifiers ID1~ID6 and ID8 pass through the gate 41 (see FIG. 2) and the RFID tag having the identifier ID7 does not pass through the gate 41.

According to the demonstration test, an appropriate value of the designated reference value is determined as 4.0 in order to determine the weighted mean signal intensities R_xs of the RFID tags having the identifiers ID1~ID6 and ID8 and the weighted mean signal intensity R_x of the RFID tag having the identifier ID7.

The mean signal intensity RA_x is illustrated for a purpose of comparison with the weighted mean signal intensity R_x. The mean signal intensity RA_x is calculated by a formula (2) as described below. Formula (2) is obtained by deleting the term (n_j/Mn) from formula (1). The term (n_j/Mn) represents a ratio of the simultaneous-read-number n_j and the maximum simultaneous-read-number Mn.

$$RA\_x = \left\{ \sum_{j=1}^{m} a\_j \times r\_j \right\} / s\_x \quad (2)$$

As illustrated in FIG. 8, the maximum simultaneous-read-number Mn with regard to the RFID tags having the identifiers ID1, ID2 and ID7 is eight. This is because the simultaneous-read-number n_j takes the maximum value '8' at the read time T8 as illustrated in FIG. 6(C).

Since the RFID tag having the identifier ID1 is read by the RFID tag reader 10 four times during the read processes T1 to T12, the number of times s_x of the RFID tag having the identifier ID1 is four. Since the RFID tag having the identifier ID2 is read by the RFID tag reader 10 four times during the read processes T1 to T12, the number of times s_x of the RFID tag having the identifier ID2 is four. Since the RFID tag having the identifier ID7 is read by the RFID tag reader 10 three times during the read processes T1 to T12, the number of times s_x of the RFID tag having the identifier ID7 is three.

As illustrated in FIG. 8, the values of numerator of formula (1) of the RFID tags having the identifiers ID1, ID2 and ID7 are 34.75, 33.675 and 6.75, respectively. The numerator of formula (1) is equal to formula (IA). The weighted mean signal intensities R_xs of the RFID tags having the identifiers ID1, ID2 and ID7 are 8.6875, 8.40625 and 2.25, respectively. The weighted mean signal intensity R_x is calculated by using formula (1). The weighted mean signal intensity R_x is calculated by performing the weighting process which uses the ratio n_j/Mn of the simultaneous-read-number n_j and the maximum simultaneous-read-number Mn as illustrated in formula (1).

Herein, for a purpose of comparison, the mean signal intensities RA_xs of the RFID tags having the identifiers ID1, ID2 and ID7 are 10.75, 9.25 and 10.0, respectively. The mean signal intensity RA_x is obtained by calculating the mean value of the signal intensities of the RFID tag 5 having the identifier IDx without weighting the signal intensities.

As described above, the designated reference value which is used at step S8 as illustrated in FIG. 7 is 4.0. In a case where the designated reference value is 4.0, the RFID tags 5 having the identifiers ID1 and ID2 are determined as the intended RFID tags at step S9 as illustrated in FIG. 7. On the contrary, the RFID tag 5 having the identifier ID7 is determined as the unwanted RFID tag at step S10 as illustrated in FIG. 7.

Accordingly, as for the RFID tags 5 having the identifiers ID1, ID2 and ID7 of which the weighted mean signal intensities R_xs are illustrated in FIG. 8, the RFID tag reader 10 determines that the IDs of the RFID tags 5 having the identifiers ID1 and ID2 are read by passing through the gate 41.

The RFID tag reader 10 determines that the RFID tag 5 having the identifier ID7 is read not by passing through the gate 41. Thus the RFID tag reader 10 determines that the RFID tag 5 having the identifier ID7 is the unwanted RFID tag. The unwanted RFID tag such as this is, for example, a type of RFID tag which does not pass through the gate 41 but is read by the RFID tag reader 10 near the gate 41, or a type of RFID tag which does not pass through the gate 41 but is read by the RFID tag reader 10 via a reflectional path formed by the forklift 7 or the like (see FIG. 2).

On the contrary, if the RFID tag reader 10 calculates the mean signal intensities RA_xs of the RFID tags 5 having the identifiers ID1, ID2 and ID7 and determines the RFID tags 5 based on the designated reference value which is set to 4.0, all of the RFID tags having the identifiers ID1, ID2 and ID7 are determined as the intended RFID tag.

Accordingly, if the RFID tag reader 10 calculates the mean signal intensities RA_xs of the RFID tags 5 having the identifiers ID1, ID2 and ID7 in order to determine the RFID tags 5, it becomes impossible to determine the RFID tag having the identifier ID7 which is read by the RFID tag reader 10 without passing through the gate 41. In this case, the RFID tag reader 10 determines that all of the RFID tags having the identifiers ID1, ID2 and ID7 pass through the gate 41.

According to the RFID tag reading system 1 as described above, it is possible to distinguish the intended RFID tag and the unwanted RFID tag by giving the weight to the signal intensity by using the ratio n_j/Mn of the maximum simultaneous-read-number Mn and the simultaneous-read-number n_j. As a result, it is possible to improve the reading accuracy of the RFID tag 5.

Although the embodiment in that the RFID tag reading system 1 is used in the delivery center is illustrated, the RFID tag reading system 1 may be used at any place where the logistics management of the articles or the like with the attached RFID tag 5 is performed. The RFID tag reading system 1 is very useful in a circumstance where there may be a possibility of reading the RFID tag 5 which does not pass between the antennas 21 and 22 but is provided close to the antennas 21 and 22. If the RFID tag reading system 1 is used in such a circumstance, it becomes possible to distinguish the intended RFID tag and the unwanted RFID tag with high accuracy.

Although the embodiment in which the antennas 21 and 22 are fixed to the gate 41 and are not moved from the gate 41 is described, the antennas 21 and 22 may be moved while reading the IDs of the RFID tags 5.

Although the embodiment in that the weighted mean signal intensity R_x is calculated by using the maximum simultaneous-read-number Mn is described, it is not always necessary to use the maximum simultaneous-read-number Mn in order to calculate the weighted mean signal intensity R_x. The signal intensity (RSSI value) may be weighted by a ratio of the simultaneous-read-number n_j and an appropriate value other than the maximum simultaneous-read-number Mn, in order to calculate the weighted mean signal intensity R_x. The appropriate value may be determined based on the demonstration test performed by the RFID tag reading system 1 according to the first embodiment, for example.

In the embodiment as described above, the answer signal is obtained by associating the ID of the RFID tag 5 recognized by the read controlling part 111 and the select signal representing necessity or unnecessity of registration of the ID of the RFID tag 5 into the database. Accordingly, the answer signal includes the ID of the RFID tag 5 regardless of the content of the select signal.

However, the answer signal may include only the ID of the RFID tag for which it is determined by the selecting part 117 that the registration is necessary.

Second Embodiment

Figure 9:
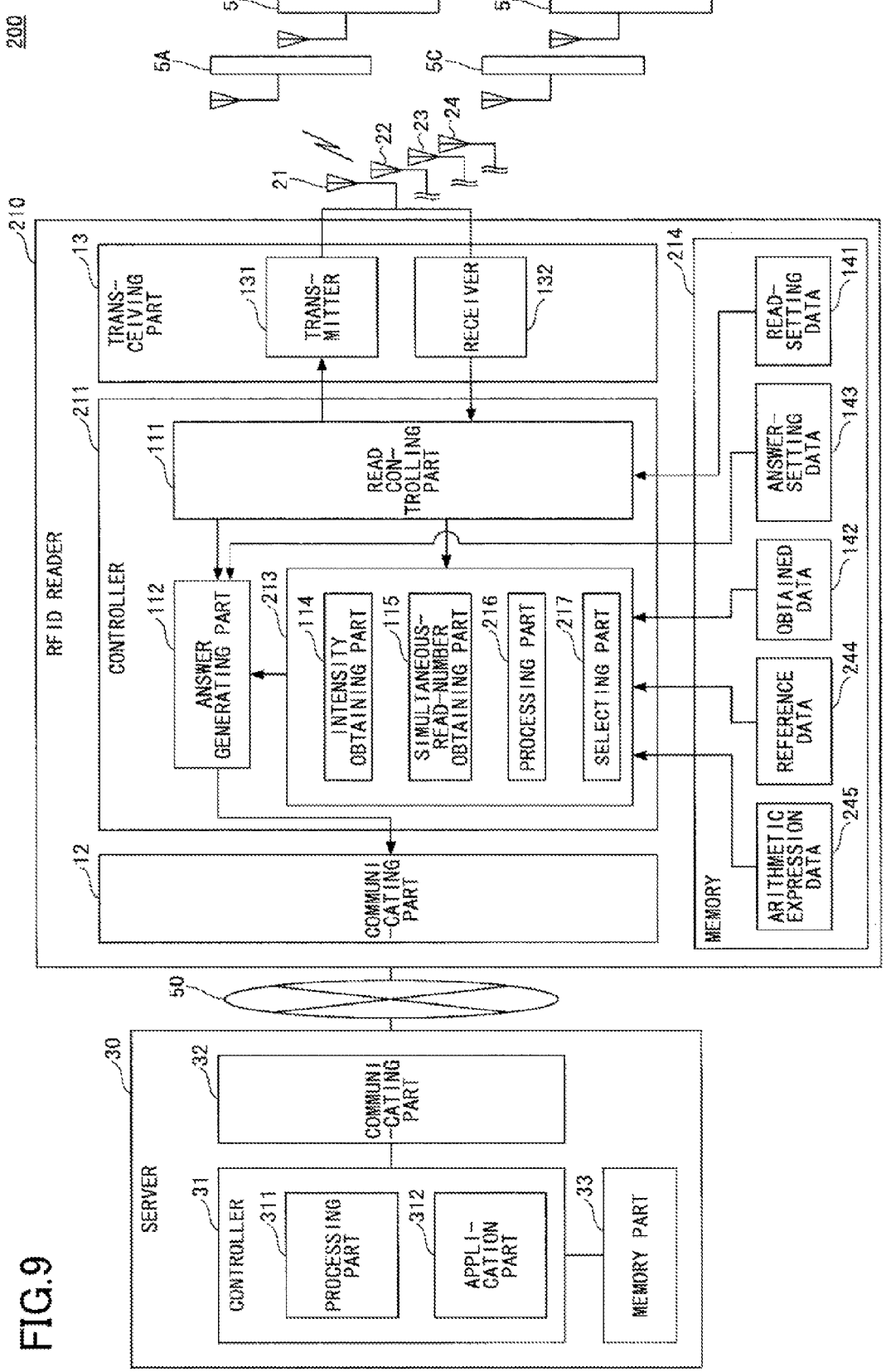
FIG. 9 is a diagram illustrating a configuration of a RFID tag reading system according to a second embodiment.

FIG. 9 is a diagram illustrating a configuration of an RFID tag reading system 200 according to the second embodiment.

The RFID tag reading system 200 includes an RFID tag reader 210, antennas 21, 22, 23 and 24, and the server 30.

The RFID tag reading system 200 of the second embodiment is different from the RFID tag reading system 1 of the first embodiment in that the RFID tag reading system 200 includes the RFID tag reader 210 and the four antennas 21, 22, 23 and 24.

The RFID tag reader 210 includes a controller 211, the communicating part 12, the transceiving part 13 and a memory 214. The RFID tag reader 210 is one example of an RFID tag reader.

The controller 211 includes the read controlling part 111, the answer generating part 112 and a read processing part 213. The controller 211 is different from the controller 11 of the first embodiment in that the controller 211 includes the read processing part 213 instead of the read processing part 113.

The read processing part 213 includes the intensity obtaining part 114, the simultaneous-read-number obtaining part 115, a processing part 216 and a selecting part 217. The read processing part 213 is different from the read processing part 113 of the first embodiment in that the read processing part 213 includes the processing part 216 and the selecting part 217 instead of the processing part 116 and the selecting part 117 of the first embodiment.

The read-setting data 141, the obtained data 142, the answer-setting data 143, a reference data 244 and an arithmetic expression data 245 are stored in the memory 214. The memory 214 is different from the memory 114 in that the memory 214 includes the reference data 244 and the arithmetic expression data 245 instead of the reference data 144 and the arithmetic expression data 145 of the first embodiment.

The RFID tag reading system 200 is different from the RFID tag reading system 1 of the first embodiment in that the processing part 216 calculates similarity of the read pattern data of the signal intensities and a reference pattern data while weighting the signal intensities. The reference pattern data is a reference data of the read pattern data. Accordingly, processes of the controller 211, the read processing part 213 and the selecting part 217 are different from those of the controller 111, the read processing part 113 and the selecting part 117, respectively. Data of the reference data 244 and the arithmetic expression data 245 are different from that of the reference data 144 and the arithmetic expression data 145, respectively.

The reference data 244 is a type of data which represents a designated reference value of the similarity. The arithmetic expression data 245 includes data representing a formula which is used for calculating the similarity and the reference pattern data which is used for calculating the similarity.

The antennas 23 and 24 are antennas that are similar to the antennas 21 and 22.

Otherwise, the RFID tag reading system 200 according to the second embodiment is similar to the RFID tag reading system 1 of the first embodiment. Accordingly, the same elements as or elements similar to those of the RFID tag reading system 1 of the first embodiment are referred to by the same reference numerals, and a description thereof is omitted.

The processing part 216 of the read processing part 213 included in the controller 211 calculates the similarity of the read pattern data and the reference pattern data by using the formula included in the arithmetic expression data 245. The similarity is calculated by using the ratio n_j/Mn of the maximum simultaneous-read-number Mn and the simultaneous-read-number n_j in a similar manner to that of the weighted mean signal intensity R_x of the first embodiment.

The selecting part 217 of the read processing part 213 included in the controller 211 compares the similarity calculated by the processing part 216 with the designated reference value stored in the reference data 244. The selecting part 217 determines that the RFID tag 5 of which the similarity is greater than the designated reference value is the intended RFID tag, and determines that the RFID tag 5 of which the similarity is less than of equal to the designated reference value is the unwanted RFID tag.

Next, an RFID tag reading process executed by the RFID tag reading system 200 according to the second embodiment will be described with reference to FIG. 10. The RFID tag reading process as illustrated in FIG. 10 is executed by the controller 211.

Figure 10:
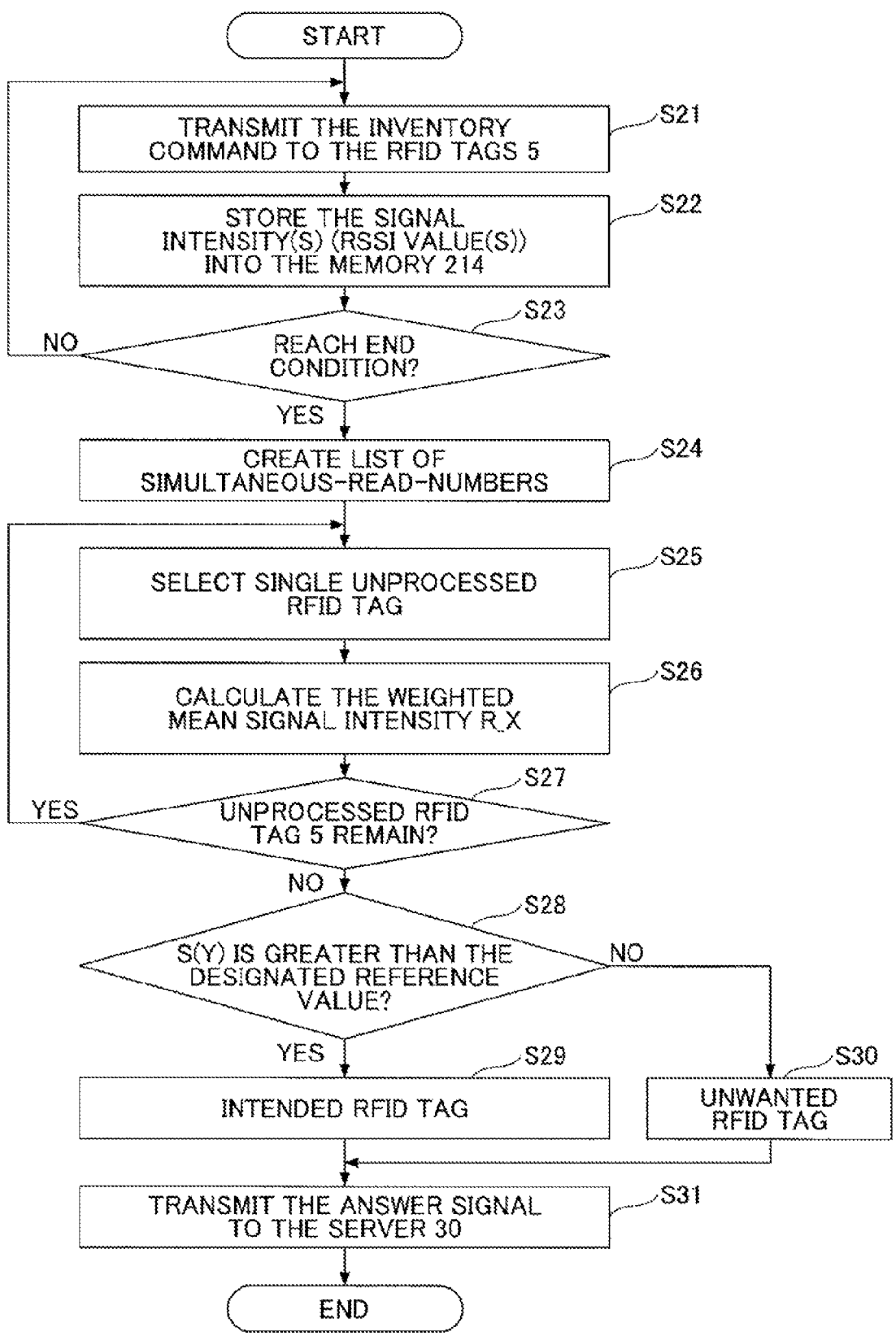
FIG. 10 is a flowchart illustrating steps of an RFID tag reading process executed by an RFID tag reader according to the second embodiment.

The RFID tag reading process as illustrated in FIG. 10 is realized by performing the method for processing the RFID tag reading process of the second embodiment, and is realized by executing the program of the reading process of the second embodiment. The program of the reading process of the second embodiment is executed by the controller 211 of the RFID tag reader 210.

FIG. 10 is a flowchart illustrating steps of the RFID tag reading process executed by the RFID tag reader 210. The read process as illustrated in FIG. 10 is executed by the controller 211 of the RFID tag reader 210.

The controller 211 transmits the inventory command to the RFID tags 5 via the transceiving part 13 by referring to the read-setting data 141 stored in the memory 214, recognizes the ID(s) of the RFID tag(s) 5, and calculates the signal intensity(s) (RSSI value(s)) (step S21).

The signal intensity(s) (RSSI value(s)) is input to the intensity obtaining part 114. The process of step S21 is executed by the read controlling part 111 of the controller 211.

Next, the controller 211 stores the signal intensity (s) (RSSI value (s)) obtained at step S21 into the memory 214 (step S22). The signal intensity(s) (RSSI value(s)) is stored into the memory 214 with data representing the read process (any one of T1 to T12) and the antenna ID. The process of step S22 is executed by the intensity obtaining part 114 of the controller 211.

Next, the controller 211 determines whether the read process reaches an end condition (step S23). The controller 211 determines that the RFID tag reading process reaches the end condition when the number of the read processes reaches the designated number included in the read-setting data 141. The process of step S23 is executed by the read controlling part 111 of the controller 211.

Next, the controller 211 creates a list of simultaneous-read-numbers (step S24). The list of the simultaneous-read-numbers is a type of list which represents the number of the RFID tag(s) 5 which is read by the RFID tag reader 10 at each of the read processes, as illustrated in FIG. 6(C). The list of the simultaneous-read-numbers created by the controller 211 is stored into the memory 214 as the obtained data 142. The process of the step S24 is executed by the simultaneous-read-number obtaining part 115.

Next, the controller 211 selects the single ID of the RFID tag 5 of which the weighted mean signal intensity is not calculated yet, and obtains the twelve signal intensities of the RFID tag 5 corresponding to the selected ID (step S25). The controller 211 executes the process of step S25 repeatedly by executing a routine including steps S25 to S27. At step S25, the controller 211 selects the single ID from the eight IDs (ID1-ID8). The twelve signal intensities are obtained at the read processes T1 to T12. Hereinafter, the RFID tag 5 of which the weighted mean signal intensity is not calculated yet is referred to as an unprocessed RFID tag. The controller 211 selects the single ID in an order in which the RFID tag reader 10 reads the eight RFID tags 5, i.e. in the order from ID1 to ID8. In other words, the eight RFID tags are selected one by one in descending order in the read pattern data as illustrated in FIG. 6(A) when the controller 211 executes the routine including steps S25 to S27. Since the read pattern data as illustrated in FIG. 6(A) includes the eight IDs (ID1-ID8), the controller 211 selects one of the eight IDs (ID1-ID8) one by one in the order from ID1 to ID8 when the controller 211 executes the routine including steps S25 to S27. In particular, the process of step S25 is executed by the processing part 216 of the controller 211.

Next, the controller 211 calculates the similarity S(y) of the RFID tag 5 corresponding to the selected ID while weighting the signal intensities of the RFID tag 5 (step S26). The similarity S (y) is calculated from the signal intensities obtained at the twelve read processes T1 to T12 of the RFID tag 5 corresponding to the selected ID. In particular, the process of step S26 is executed by the processing part 216 of the controller 211.

Herein, the similarity S(y) is a similarity of the read pattern data of the signal intensities obtained at plural of the read processes and the reference pattern data.

The similarity S(y) is calculated by the weighting process in which the ratio n_j/Mn of the simultaneous-read-number n_j and the maximum simultaneous-read-number Mn are used in a similar manner to the weighting process used for calculating the weighted mean signal intensity R_x.

The reference pattern data represents a reference pattern which includes a time series change of the signal intensities that are obtained at plural of the read processes performed sequentially. The reference pattern data may be obtained by performing a demonstration test of the RFID tag reading process in the RFID tag reading system 200 in advance.

The process for calculating the similarity performed by the RFID tag reading system 200 according to the second embodiment will be described later with reference to FIGS. 11 to 16.

The controller 211 determines whether any unprocessed RFID tag 5 remains (step S27). Accordingly, the controller 211 determines whether the similarities are calculated with regard to all of the IDs included in the obtained data at step S27. In particular, the process of step S27 is executed by the processing part 216 of the controller 211.

If the controller 211 determines that an unprocessed RFID tag 5 does not remain at step S27 (S27 NO), the controller 211 determines whether each similarity S(y) is greater than the designated reference value (step S28). The process of step S28 is performed with regard to each of the similarities S(y)s obtained by executing the process of step S26 repeatedly. Data of the designated reference value is stored in the memory 214 as the reference data 244. In particular, the process of step S28 is executed by the selecting part 217 of the controller 211.

If the controller 211 determines that the similarity S(y) is greater than the designated reference value at step S28 (S28 YES), the controller 211 determines that the RFID tag 5 is the intended RFID tag (step S29). In other words, at step S29, the controller 211 determines that it is necessary to register the RFID tag 5 of which the similarity S(y) is greater than the designated reference value. The selecting part 217 inputs the ID of the intended RFID tag which is determined at step S29 and a determination result of step S29 to the answer generating part 112. The determination result of step S29 represents that it is necessary to register the intended RFID tag into the database.

On the contrary, if the controller 211 determines that the similarity S(y) is not greater than the designated reference value at step S28 (S28 NO), the controller 211 determines that the RFID tag 5 is the unwanted RFID tag (step S30). In other words, at step S30, the controller 211 determines that it is not necessary to register the RFID tag 5 of which the similarity S(y) is not greater than the designated reference value. The selecting part 217 inputs the ID of the unwanted RFID tag which is determined at step S30 and a determination result of step S30 to the answer generating part 112. The determination result of step S30 represents that it is not necessary to register the unwanted RFID tag into the database.

By executing the steps S29 and S30, the IDs of the intended RFID tag(s) and the unwanted RFID tag(s) and the determination results of steps S9 and S10 are input to the answer generating part 112.

The selecting part 217 sorts the RFID tags 5 based on the similarity S(y) calculated by the processing part 216 and generates the select signal by executing the processes of steps S28 to S30 in a manner as described above. The selecting part 217 generates the select signal which represents necessity or unnecessity of registration of the ID of the RFID tag 5 into the database.

When the controller 211 finishes the processes of step S29 or S30, the controller 211 generates the answer signal and transmits the answer signal to the server 30 (step S31). The process of step S31 is executed by the answer generating part 112 of the controller 211.

The answer generating part 112 generates the answer signals based on the IDs of the RFID tags 5 recognized by the read controlling part 111 and the select signal of the read processing part 213.

The answer signal is a type of signal in which the ID of the RFID tag 5 recognized by the read controlling part 111 and the select signal are associated with each other. The select signal represents necessity or unnecessity of registration of the ID of the RFID tag 5 into the database. The answer generating part 112 transmits the answer signal to the server 30 via the communicating part 12.

When the controller 31 of the server 30 receives the answer signal, the controller 31 registers the ID to which the select signal representing the necessity of the registration of the ID is associated into the database. In other words, the controller 31 registers the ID of the intended RFID tag into the database, but does not register the ID of the unwanted RFID tag into the database. Accordingly, the IDs of the RFID tags that pass through the gate 41 (see FIG. 2) are registered into the database of the server 30.

In a case where the controller 211 determines that the unprocessed RFID tag 5 remains at step S27 (S27 YES), the controller 211 returns to step S25. As a result, the processes of steps S25 to S27 are performed repeatedly, and the similarities S(y)s are calculated for all of the RFID tags 5. The similarities S(y)s are calculated one by one at step S26 while performing the processes of steps S25 to S27 repeatedly.

Next, a method for calculating the similarity will be described with reference to the FIGS. 11 and 12.

FIG. 11 is a diagram illustrating examples of an obtained pattern, a reference obtained pattern, a relationship between the antenna ID and the obtained pattern, and a relationship between the antenna ID and the reference obtained pattern. In particular, FIG. 11(A) illustrates the examples of the obtained pattern and the reference obtained pattern. FIG. 11(B) illustrates the relationship between the antenna ID and the obtained pattern. FIG. 11(C) illustrates the relationship between the antenna ID and the reference obtained pattern.

In this example, as illustrated in FIG. 11(A), the obtained pattern y is expressed as y=y1, y2, y3 ... yN−2, yN−1, yN.

The obtained pattern y1, y2, y3 ... yN−2, yN−1, yN is a pattern data in which the read pattern data (see FIG. 6(A)) generated by the read processing part 113 and the list of the simultaneous-read-number (see FIG. 6(C)) generated by the simultaneous-read-number obtaining part 115 are associated.

Each element of the obtained pattern is expressed by a general expression $y\_i=<r(y)\_i, n(y)\_i>$ ($1<=i<=N$). Herein, the term $r(y)\_i$ represents the signal intensity (RSSI value) obtained at the ith read process. In other words, the term $r(y)\_i$ represents the RSSI value included in the read pattern data which is obtained at the ith read process. Index i is a suffix which takes from 1 to N, where N is an integer number greater than one.

The term $n(y)\_i$ represents the simultaneous-read-number obtained at the ith read process. In other words, the term $n(y)\_i$ represents the simultaneous-read-number having the index i included in the list of the simultaneous-read-number.

As illustrated in FIG. 11(A), the RFID tag reading system 200 holds the reference obtained pattern z which is expressed as z=z1, z2, z3 ... zM−2, zM−1, zM. Data representing the reference obtained pattern z is stored in the arithmetic expression data 245 of the memory 214.

The reference obtained pattern z is a type of data in which the reference pattern data and the simultaneous-read-number are associated, for example. The reference pattern data included in the reference obtained pattern z is a type of data in which the signal intensities obtained by performing a demonstration test of the RFID tag reading process in the RFID tag reading system 200 are arranged in chronological order. In other words, the reference pattern data included in the reference obtained pattern z includes time series change of the signal intensities obtained by performing a demonstration test of the RFID tag reading process in the RFID tag reading system 200.

Each element $z\_j$ of the reference obtained pattern z is expressed as $z\_j=<r(z)\_j, n(z)\_j>$ ($1<=j<=M$). The term $r(z)\_j$ represents the signal intensity (RSSI value) obtained at the jth read process. In other words, the term $r(z)\_j$ represents the RSSI value included in the reference pattern data which is obtained at the jth read process. Index j is a suffix which takes from 1 to M, where M is an integer number greater than one.

The term $n(z)\_j$ represents the simultaneous-read-number obtained at the jth read process.

The reference data 244 is a type of data which is generated by associating the reference pattern data and the simultaneous-read-number. The reference pattern data included in the reference data 244 is obtained by performing a demonstration test of the RFID tag reading process in the RFID tag reading system 200.

Herein, the relationship of the obtained pattern y and the antenna ID as illustrated in FIG. 11(B) is obtained. The antenna IDs as illustrated in FIGS. 11(B) and 11(C) represent the antenna IDs of the antennas 21, 22, 23 and 24. ID='1' represents the antenna ID of the antenna 21, ID='2' represents the antenna ID of the antenna 22, ID='3' represents the antenna ID of the antenna 23, and ID='4' represents the antenna ID of the antenna 24.

Accordingly, the element y1 of the obtained pattern as illustrated in FIG. 11(B) includes the signal intensity $r(y)\_1$ which is obtained via the antenna 23. The element y2 of the obtained pattern as illustrated in FIG. 11(B) includes the signal intensity $r(y)\_2$ which is obtained via the antenna 24. The element y3 of the obtained pattern as illustrated in FIG. 11(B) includes the signal intensity $r(y)\_3$ which is obtained via the antenna 21.

The element yN−2 of the obtained pattern as illustrated in FIG. 11(B) includes the signal intensity $r(y)\_N-2$ which is obtained via the antenna 21. The element yN−1 of the obtained pattern as illustrated in FIG. 11(B) includes the signal intensity $r(y)\_N-1$ which is obtained via the antenna 22. The element yN of the obtained pattern as illustrated in FIG. 11(B) includes the signal intensity $r(y)\_N$ which is obtained via the antenna 23.

The element z1 of the reference obtained pattern as illustrated in FIG. 11(C) includes the signal intensity $n(z)\_1$ which is obtained via the antenna 21. The element z2 of the reference obtained pattern as illustrated in FIG. 11(C) includes the signal intensity $n(z)\_2$ which is obtained via the antenna 22. The element z3 of the reference obtained pattern as illustrated in FIG. 11(C) includes the signal intensity $n(z)\_3$ which is obtained via the antenna 23.

The element zM−2 of the reference obtained pattern as illustrated in FIG. 11(C) includes the signal intensity $n(z)\_M-2$ which is obtained via the antenna 22. The element zM−1 of the reference obtained pattern as illustrated in FIG. 11(C) includes the signal intensity $n(z)\_M-1$ which is obtained via the antenna 23. The element zM of the reference obtained pattern as illustrated in FIG. 11(C) includes the signal intensity $n(z)\_M$ which is obtained via the antenna 24.

As described above, the element y1 of the obtained pattern and the element z1 of the reference obtained pattern are obtained via the different antennas 23 and 21. The element y1 of the obtained pattern is obtained at the 1st read process performed by the RFID tag reading system 200 in an actual operation. The element z1 of the reference obtained pattern are obtained at the 1st read process performed in the demonstration test of the RFID tag reading process in the RFID tag reading system 200.

Since the read processes are performed by using the four antennas 21 to 24 alternately, the signal intensity r(y)_1 included in the obtained pattern and the signal intensity n(z)_1 included in the reference obtained pattern may be obtained via the different antennas.

Herein, locations of the four antennas 21 to 24 are different from each other, in a precise sense.

The signal intensities that are obtained from the antennas provided in the different locations may be different largely. Accordingly, it is preferable to compare the signal intensity n(y)_i included in the obtained pattern and the signal intensity n(z)_j included in the reference obtained pattern that are obtained via the same antenna in order to calculate the similarity of the read pattern data and the reference pattern data.

Accordingly, the RFID tag reading system 200 calculates the similarity of the read pattern data and the reference pattern data based on the signal intensity n(y)_i included in the obtained pattern and the signal intensity n(z)_j included in the reference obtained pattern that are obtained via the same antenna. The method for calculating the similarity will be described with reference to FIGS. 12 to 14.

Figure 12:
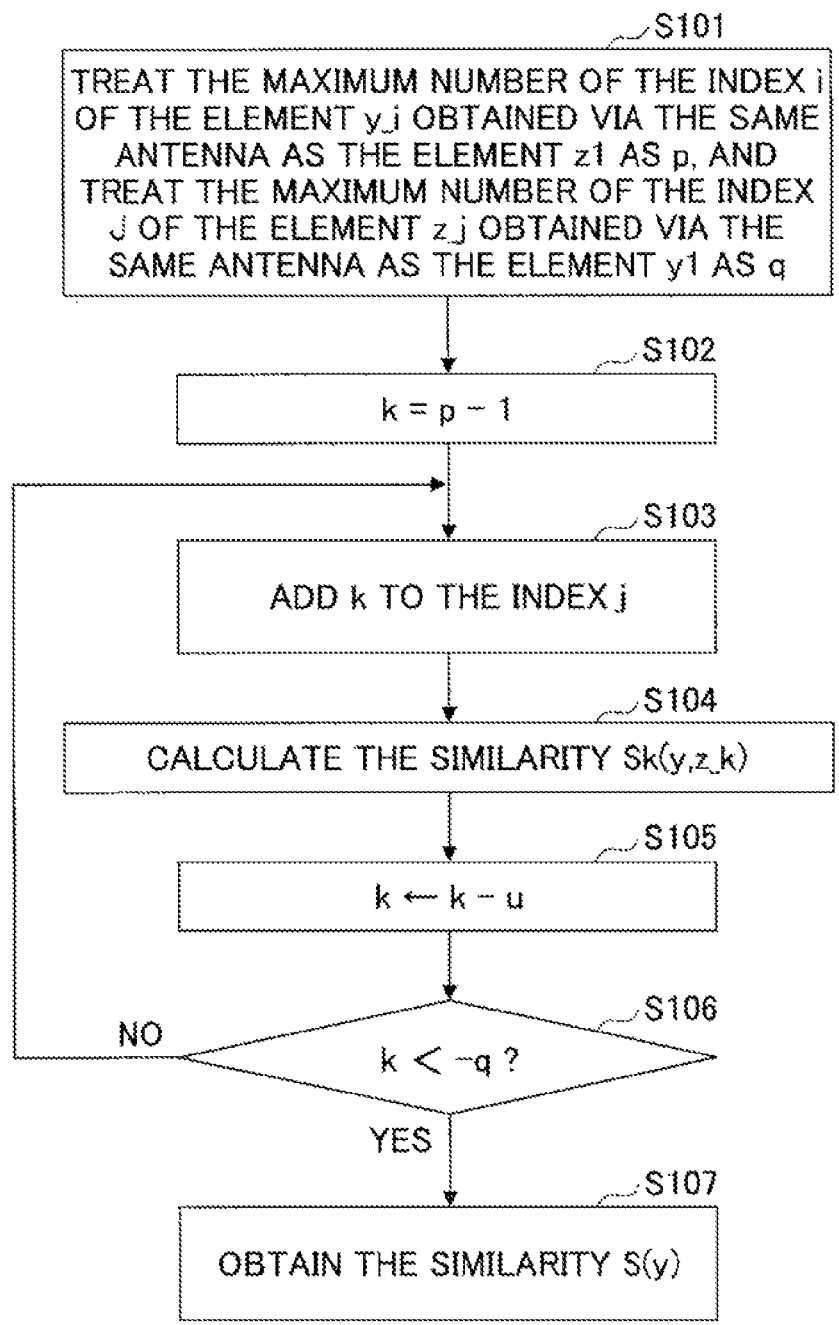
FIG. 12 is a flowchart illustrating a process of step S26 as illustrated in FIG. 10.

FIG. 12 is a flowchart illustrating the process of step S26 as illustrated in FIG. 10. In particular, the processes as illustrated in FIG. 12 are executed by the processing part 216 of the controller 211.

FIGS. 13 and 14 are diagrams illustrating processes of calculating the similarity while changing values of the index i.

The processing part 216 treats the maximum number of the index i of the element y_i which is obtained via the same antenna as the element z1 of the reference obtained pattern as p, and treats the maximum number of the index j of the element z_j which is obtained via the same antenna as the element y1 of the obtained pattern as q (step S101).

According to the obtained pattern and the reference obtained pattern, p=N−2 and q=M−1 are obtained. Number u of antennas 21 to 24 is four, i.e. u=4.

The processing part 216 calculates a value k by subtracting 1 from p (step S102). Since p=N−2 is obtained at step S101, it is determined that k=N−3 at step S102.

Next, the processing part 216 adds k(=N−3) obtained at step S102 to the index j of the reference obtained pattern z (step S103).

Accordingly, as illustrated in FIG. 13(A), a reference obtained pattern z_k is generated from the reference obtained pattern z by adding the value k to the index j of the reference obtained pattern z. The reference obtained pattern z_k is generated by adding k(=N−3) to the index j of the reference obtained pattern z as illustrated in FIG. 11(A). The index j takes values from 1 to M. Accordingly, the reference obtained pattern z_k including zN−2~zM+N−3 is generated.

Next, the processing part 216 calculates the similarity Sk(y, z_k) by using the formula included in the arithmetic expression data 245 (step S104). The processing part 216 uses formula (3) included in the arithmetic expression data 245. The processing part 216 stores the similarity Sk(y,z_k) into the memory 214 as the obtained data 142.

$$Sk(y, z) = \sum_{i,j=1}^{N} \{r(y)\_i \times r(z)\_i \times (n(y)\_i / Mn)\} / \sqrt{\{L(y) \times L(z)\}} \quad (3)$$

The term r(y)_i represents the signal intensity (RSSI value) obtained at the ith read process. In other words, the term r(y)_i represents the RSSI value included in the read pattern data which is obtained at the ith read process.

The term r(z)_j represents the signal intensity (RSSI value) included in the reference pattern data obtained at the jth read process.

The term n(y)_i represents the simultaneous-read-number obtained at the ith read process. In other words, the term n(y)_i represents the simultaneous-read-number having the index i included in the list of the simultaneous-read-number.

The maximum simultaneous-read-number Mn is the maximum value of the simultaneous-read-numbers obtained from the read process T1 to the read process T12.

Values of L(y) and L(z) included in formula (3) are derived from formulae (4) and (5).

$$L(y) = \sum_{i=1}^{N} (r(y)\_i)^2 \quad (4)$$

$$L(z) = \sum_{j=1}^{M} (r(z)\_j)^2 \quad (5)$$

L(y) expressed by formula (4) is a sum of squares of r(y)_i where the index i takes values from 1 to N. L(z) expressed by formula (5) is a sum of squares of r(z)_j where j takes values from 1 to M.

Next, the processing part 216 reduces the value of k by u (step S105). Accordingly, the value k is reduced by u and is updated to k−u. The value of u represents the number of the antennas 21~24, i.e. u=4.

Next, the processing part 216 determines whether k is less than −q (step S106). The value q is obtained as the maximum number of the index j of the element z_j which is obtained via the same antenna as the element y1 of the obtained pattern at step S101. The value q is obtained as M−1, i.e q=M−1.

If k is not less than −q (S106 NO), the processing part 216 returns to step S103. Accordingly, the processes of steps S103~S106 are executed repeatedly.

If the processing part 216 determines that k is less than −q (S106 YES), the processing part 216 goes to step S107.

Herein, the method for calculating the similarity by using formulae (3)~(5) will be described with reference to steps S103~S106, before describing the contents of the step S107.

As illustrated in formula (3), calculation of Sk(y,z) is performed by multiplying a ratio n(y)_i/Mn and a product of r(y)_i and r(z)_j having the same index i, and dividing a result of the multiplication by √{L(y)×L(z)} while increasing the indexes i and j from 1 to N. The ratio n(y)_i/Mn is obtained by dividing the simultaneous-read-number n(y)_i by the maximum simultaneous-read-number Mn.

The calculation of Sk(y,z) is performed by calculating the similarity of the read pattern data and the reference pattern data, and by weighting the similarity with the ratio n(y)_i/Mn. The similarity of the read pattern data and the reference pattern data are calculated by multiplying the read pattern data r(y)_i and the reference pattern data r(z)_j, and dividing the product of r(y)_i and r(z)_j by √{L(y)×L(z)}.

When a routine of steps S103~S106 is performed for the first time, the value k is N−3 (k=N−3). Accordingly, the calculation of the similarity is performed with regard to the obtained pattern yN−2, yN−1, yN and the reference obtained pattern zN−2, zN−1, zN, as illustrated in FIG. 13(B).

In order to calculate Sk(y,z), the similarity of the read pattern data r(y)_N−2, r(y)_N−1, r(y)_N included in the obtained pattern yN−2, yN−1, yN and the reference pattern data r(z)_N−2, r(z)_N−1, r(z)_N included in the reference obtained pattern zN−2, zN−1, zN are calculated, and a weighting process is performed by using the ratios n(y)_N−2/Mn, n(y)_N−1/Mn, n(y)_N/Mn.

When the value k is reduced by u (u=4) at step S105, the routine of steps S103~S106 is performed for the second time. In this condition, the reference pattern data is shifted to the left by four as compared with the reference pattern data as illustrated in FIG. 13(B).

As a result, the reference obtained pattern z_k includes zN−6~zM+N−7 as illustrated in FIG. 14(A), and the Sk(y,z) is calculated by formula (3) based on the obtained pattern yN−6~yN and the reference obtained pattern zN−6~zN.

At step S104 in the last routine before the processing part 216 determines that k is less than −q at step S106, the reference obtained pattern z_k includes zk to z3 as illustrated in FIG. 14(B). As a result, the calculation of formula (3) is performed based on the obtained pattern y1~y3 and the reference obtained pattern z1~z3.

When the routine of steps S103~S106 is finished, the processing part 216 determines that k is less than −q (S106 YES) and the processing part 216 goes to step S107.

The processing part 216 extract the maximum similarity Sk(y,z_k) of the similarities Sk(y,z_k) stored in the memory 214 as the obtained data 142 as the similarity S(y). In other words, the similarity S(y) is the maximum value of the similarities Sk(y,z_k) stored in the memory 214 as the obtained data 142. The processing part 216 obtains the similarity S(y) in a manner as described above.

The similarity Sk(y,z_k) is the similarity of the read pattern data included in the obtained pattern and the reference pattern data included in the reference obtained pattern, and is calculated by performing the weighting process.

The similarity S(y) is the maximum value of all of the similarities Sk(y,z_k) that are obtained by changing the value k. Accordingly, the similarity S(y) is calculated in a condition where the obtained pattern is closest to the reference obtained pattern.

If the processing part 216 extracts the similarity S(y), the controller 211 goes to step S27 as illustrated in FIG. 10. Hereinafter, the controller 211 performs the processes of steps S27 to S31 in a manner similar to those of steps S7 to S11.

At step S31, the controller 211 generates the answer signal and transmits the answer signal to the server 30 (step S31). The process of step S31 is executed by the answer generating part 112 of the controller 211.

Next, the calculation result of the similarity calculated by formula (3) will be described with reference to FIGS. 15 and 16.

FIG. 15 is a diagram illustrating an example of the relationship of the signal intensities read by the RFID tag reading system 200 in chronological order, the IDs of the RFID tags 5, the antenna IDs, the simultaneous-read-number of the RFID tag(s) 5.

The read pattern data as illustrated in FIG. 15(A) and the list of the simultaneous-read-number as illustrated in FIG. 15(C) are similar to the read pattern data as illustrated in FIG. 6(A) and the list of the simultaneous-read-number as illustrated in FIG. 6(C), respectively.

Since the RFID tag reading system 200 of the second embodiment includes the four antennas 21~24, the read processes T1~T4 are performed by using the antennas 21~24 having the antenna IDs 1~4, respectively. Similarly, the read processes T5~T8 are performed by using the antennas 21~24 having the antenna IDs 1~4, respectively. The read processes T9~T12 are performed by using the antennas 21~24 having the antenna IDs 1~4, respectively.

The signal intensities, the read processes, the IDs of the RFID tags 5, the antenna IDs, and the simultaneous-read-number are obtained in a condition where the RFID tags 5 having the identifiers ID1 and ID8 pass through the gate 41 (see FIG. 2) and the RFID tag 5 having the identifier ID7 does not pass through the gate 41.

A result as illustrated in FIG. 16 is obtained by calculating the similarities based on formula (3) with reference to the RFID tags 5 having the identifiers ID1, ID2 and ID7. The designated reference value which is used at step S28 as illustrated in FIG. 10 in order to determine necessity or unnecessity of the registration of the RFID tag 5 into the database is set to 0.5.

FIG. 16 is a diagram illustrating the result of the calculation of the similarities in the RFID tag reading system 200 according to the second embodiment.

As illustrated in FIG. 16, the similarity S(y) of the RFID tag 5 having the identifier ID1 is 0.777, the similarity S(y) of the RFID tag 5 having the identifier ID2 is 0.858, and the similarity S(y) of the RFID tag 5 having the identifier ID3 is 0.366.

As described above, the designated reference value which is used for determining necessity or unnecessity of the registration of the RFID tag 5 into the database is set to 0.5. As for the RFID tags 5 having the identifiers ID1 and ID2, it is determined that the registrations of these RFID tags 5 are necessary at step S28. As for the RFID tag 5 having the identifier ID7, it is determined that the registration is not necessary at step S28.

According to the RFID tag reading system 200, it is determined that the RFID tags 5 having the identifiers ID1 and ID2 are read by the RFID tag reader 210 by passing through the gate 41 (see FIG. 2).

The RFID tag reader 210 determines that the RFID tag 5 having the identifier ID7 is read not by passing through the gate 41. Thus the RFID tag reader 210 determines that the RFID tag 5 having the identifier ID7 is the unwanted RFID tag. The unwanted RFID tag such as this is, for example, a type of RFID tag which does not pass through the gate 41 but is read by the RFID tag reader 10 around the gate 41, or a type of RFID tag which does not pass through the gate 41 but is read by the RFID tag reader 10 via a reflectional path formed by the forklift 7 or the like (see FIG. 2).

According to the RFID tag reading system 200 as described above, it is possible to distinguish the intended RFID tag and the unwanted RFID tag by calculating the similarity and by giving the weight to the similarity by the ratio n_j/Mn of the maximum simultaneous-read-number Mn and the simultaneous-read-number n_j. As a result, it is possible to improve the reading accuracy of the RFID tag 5.

As described above, the demonstration of the RFID tag reading system 200 is performed by using the read pattern data including the read result of the RFID tag 5 having the identifier ID7 which does not pass through the gate 41. As illustrated in FIG. 15(A), at the read process T8, the read result of the RFID tag 5 having the identifier ID7 indicates lower signal intensity than the signal intensities of the RFID tags 5 having the identifiers ID1~ID6 and ID8. The above case corresponds to a case where the RFID tag 5 having the identifier ID7 is located far from the antennas 21~24 compared with the RFID tags 5 having the identifiers ID1~ID6 and ID8.

The RFID tag reading system 200 of the second embodiment calculates the similarity S(y) while weighting the similarity of the read pattern data and the reference pattern data, as described above. Accordingly, for example, in a case where the RFID tag having the identifier ID7 is located close to the antennas 21~24 and the lest of the RFID tags 5 having the identifiers ID1~ID6 and ID8 pass through the gate 41, it is assumed that the similarity calculated for the RFID tag having the identifier ID7 becomes lower than the designated reference value.

Since the signal intensity of the RFID tag having the identifier ID7 located close to the antennas 21~24 becomes higher than the signal intensities of the RFID tags 5 that pass through the gate 41, the similarity of the RFID tag having the identifier ID7 becomes lower than the similarities of the RFID tags 5 that pass through the gate 41 in a case as described above.

According to the RFID tag reading system 200 of the second embodiment, in a case where the RFID tag is located close to the antennas 21~24 and does not pass through the gate 41, it is possible to determine that the RFID tag is the unwanted RFID tag.

Although the embodiment in that the similarity S(y) is calculated by using the maximum simultaneous-read-number Mn is described, it is not always necessary to use the maximum simultaneous-read-number Mn in order to calculate the similarity S(y). The signal intensity (RSSI value) may be weighted by a ratio of the simultaneous-read-number n_j and an appropriate value other than the maximum simultaneous-read-number Mn, in order to calculate the similarity S(y). The appropriate value may be determined based on the demonstration test performed by the RFID tag reading system 200 according to the second embodiment, for example.

Although the embodiment in which the RFID tag reading system 200 includes the four antennas 21~24, any number of the antenna may be included in the RFID tag reading system 200.

So far, the preferred embodiments and modification of the RFID tag reader, the RFID tag reading system, the method for performing RFID tag reading process and the computer-readable recording medium are described. However, the invention is not limited to those specifically described embodiments and the modification thereof, and various modifications and alteration may be made within the scope of the inventions described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An RFID tag reader comprising:
   a signal intensity obtaining part configured to obtain signal intensities of a plurality of RFID tags that are read at plural read processes;
   a read-quantity obtaining part configured to obtain the quantity of the RFID tags read at each of the plural read processes;
   a processing part configured to weight the signal intensities of the plurality of RFID tags in a manner that the greater the quantity of the RFID tags, the greater the signal intensity is weighted and that the smaller the quantity of the RFID tags, the less the signal intensity is weighted; and
   a selecting part configured to select a target RFID tag from the plurality of RFID tags, the target RFID tag having a signal intensity weighted by the processing part, wherein the signal intensity of the target RFID tag is greater than a designated value.

2. The RFID tag reader as claimed in claim 1, wherein the processing part weights the signal intensities based on a ratio of the quantity and a designated reference value.

3. The RFID tag reader as claimed in claim 2, wherein the designated reference value is the maximum value of the quantity of the of RFID tags.

4. The RFID tag reader as claimed in claim 1, wherein the processing part calculates a sum of the signal intensities that are obtained at each of the plural read processes and are weighted based on the quantity of the of RFID tags, and
   wherein the selecting part selects the target RFID tag of which the sum is greater than a designated reference value.

5. The RFID tag reader as claimed in claim 1, wherein the processing part calculates a similarity of a read pattern data which represents time series of the signal intensities obtained at the plural read processes and a reference pattern data while weighting the signal intensities based on the quantity of the of RFID tags, and
   wherein the selecting part selects the target RFID tag of which the similarity is greater than a designated reference value.

6. An RFID tag reading system comprising:
   the RFID tag reader as claimed in claim 1;
   an antenna configured to be connected to the signal intensity obtaining part, and to read the plurality of RFID tags; and
   a processing unit configured to receive a result which indicates the target RFID tag selected by the selecting part.

7. A method for performing RFID tag reading process comprising:
   first obtaining signal intensities of a plurality of RFID tags that are read at plural read processes;
   second obtaining the quantity of the RFID tags read at each of the plural read processes;
   weighting the signal intensities of the plurality of RFID tags in a manner that the greater the quantity of the RFID tags, the greater the signal intensity is weighted and that the smaller the quantity of the RFID tags, the less the signal intensity is weighted; and
   selecting a target RFID tag from the plurality of RFID tags, the target RFID tag having a signal intensity weighted by the weighting, wherein the signal intensity of the target RFID tag is greater than a designated value.

8. A computer-readable, non-transitory medium storing a program which, when executed by a computer, causes the computer to perform a reading process, the reading process comprising:
   first obtaining signal intensities of a plurality of RFID tags that are read at plural read processes;
   second obtaining the quantity of the RFID tags read at each of the plural read processes;

weighting the signal intensities of the plurality of RFID tags in a manner that the greater the quantity of the RFID tags, the greater the signal intensity is weighted and that the smaller the quantity of the RFID tags, the less the signal intensity is weighted; and selecting a target FID tag from the plurality of RFID tags, the target RFID tag having a signal intensity weighted by the weighting, wherein the signal intensity of the target RFID tag is greater than a designated value.

* * * * *